(12) United States Patent
Nomura

(10) Patent No.: US 11,384,209 B2
(45) Date of Patent: Jul. 12, 2022

(54) COMPOSITE MATERIAL INCLUDING CARBON FIBERS AND THERMOPLASTIC RESIN, MOLDED BODY PRODUCTION METHOD USING SAME, AND MOLDED BODY

(71) Applicant: Teijin Limited, Osaka (JP)

(72) Inventor: Akihisa Nomura, Osaka (JP)

(73) Assignee: TEIJIN LIMITED, Osaka (JP)

( * ) Notice: Subject to any disclaimer, the term of this patent is extended or adjusted under 35 U.S.C. 154(b) by 357 days.

(21) Appl. No.: 16/481,343

(22) PCT Filed: Jan. 31, 2018

(86) PCT No.: PCT/JP2018/003239
§ 371 (c)(1),
(2) Date: Jul. 26, 2019

(87) PCT Pub. No.: WO2018/143283
PCT Pub. Date: Aug. 9, 2018

(65) Prior Publication Data
US 2019/0359781 A1 Nov. 28, 2019

(30) Foreign Application Priority Data

Feb. 3, 2017 (JP) .............................. JP2017-018358

(51) Int. Cl.
*C08J 5/04* (2006.01)
*B29C 70/46* (2006.01)

(52) U.S. Cl.
CPC .............. *C08J 5/042* (2013.01); *B29C 70/46* (2013.01)

(58) Field of Classification Search
CPC . B29B 11/12; Y10T 442/20; Y10T 442/2926; Y10T 442/2984;
(Continued)

(56) References Cited

U.S. PATENT DOCUMENTS 9,752,002 B2 9/2017 Fujita et al.
10,751,957 B2 8/2020 Fujioka et al.
(Continued)

FOREIGN PATENT DOCUMENTS

CN 101181828 A 5/2008
CN 101600550 A 12/2009
(Continued)

OTHER PUBLICATIONS

International Search Report dated Apr. 3, 2018 for International Application No. PCT/JP2018/003239 filed Jan. 31, 2018.
(Continued)

*Primary Examiner* — Camie S Thompson
(74) *Attorney, Agent, or Firm* — Blue Filament Law PLLC

(57) ABSTRACT

Provided is a composite material including carbon fibers having a weight average fiber length of 1 mm or more and 100 mm or less and a thermoplastic resin. The composite material satisfies K1≤1.5×K2 and exhibits excellent conformability during a stretching step in press molding; and a press molded body production method using said composite material. K1 represents the inclination of an approximate straight line of linear approximation on the plot in the range of 35% strain or more, obtained by strain sweep tests from 0% to 100% on the composite material at a temperature of 270° C., a shear of 100 rad/sec, and a normal load of 2 N, plotting, both in logarithmic scales, the values of strain % versus the values of complex viscosity coefficient Pa·sec. K2 represents the inclination of an approximate straight line of linear approximation on the plot in the range of less than 35% strain.

11 Claims, 10 Drawing Sheets

(58) Field of Classification Search
CPC ....... Y10T 442/24124; Y10T 442/2913; Y10T 442/2931; Y10T 442/3065; Y10T 156/10; B32B 2262/106; B32B 2262/10; B32B 2262/14; B32B 2305/076; B32B 2260/046; B29C 70/081; B29C 70/0861; B29C 70/40; B29C 70/46; B29C 70/20; B29C 2043/463; B29C 43/22; B29C 43/18; B29C 43/14; C08J 5/24; C08J 5/06; C08J 5/042; C08J 5/04; C08J 2371/12; C08J 2471/12; C08L 71/12; C08L 77/00; C08K 7/02; B29K 2101/12; B29K 2105/06
USPC ........... 252/500; 524/384, 495; 156/242, 60, 156/196; 442/175, 60, 172, 308; 428/113, 220, 401, 137, 364
See application file for complete search history.

(56) References Cited

U.S. PATENT DOCUMENTS

| | | | |
|---|---|---|---|
| 2006/0035548 | A1 | 2/2006 | Goto et al. |
| 2006/0280938 | A1 | 12/2006 | Atkinson |
| 2009/0123717 | A1 | 5/2009 | Goto et al. |
| 2010/0028593 | A1 | 2/2010 | Taketa et al. |
| 2011/0151206 | A1 | 6/2011 | Goto et al. |
| 2012/0276795 | A1 | 11/2012 | Goto et al. |
| 2013/0095282 | A1 | 4/2013 | Taketa et al. |
| 2014/0057514 | A1 | 2/2014 | Goto et al. |
| 2016/0009054 | A1 | 1/2016 | Okunaka |
| 2017/0016503 | A1 | 1/2017 | Teshima |
| 2018/0134856 | A1 | 5/2018 | Nomura et al. |

FOREIGN PATENT DOCUMENTS

| | | |
|---|---|---|
| CN | 103173007 A | 6/2013 |
| CN | 104387747 A | 3/2015 |
| CN | 105073848 A | 11/2015 |
| JP | A-H06-335934 A | 12/1994 |
| JP | 2005-263828 A | 9/2005 |
| JP | 2011-012206 A | 11/2011 |
| JP | 2013-056976 A | 3/2013 |
| WO | 2004065117 A2 | 8/2004 |
| WO | 2014/084194 A1 | 5/2014 |
| WO | 2015/125646 A1 | 8/2015 |
| WO | 2017/056693 A1 | 6/2017 |

OTHER PUBLICATIONS

Written Opinion dated Apr. 3, 2018 for International Application No. PCT/JP2018/003239 filed Jan. 31, 2018.
Office Action issued in corresponding Chinese Patent Appln. No. 201880010321.6, dated Jan. 28, 2021.
Office Action issued in co-pending JP Appln. No. 2018-565613, dated Feb. 12, 2020.

FIG.1
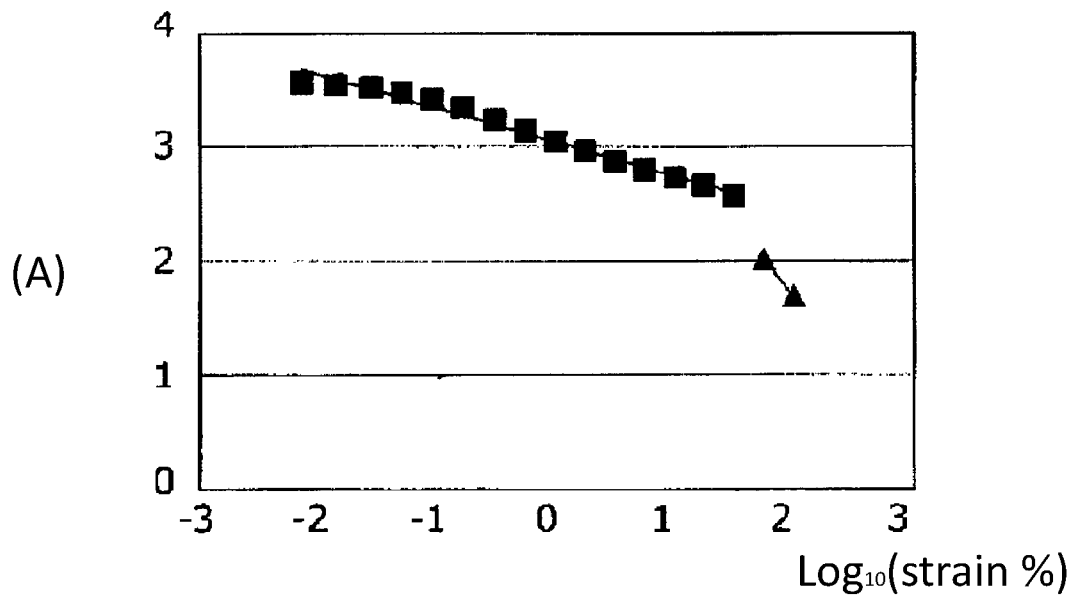
(A)
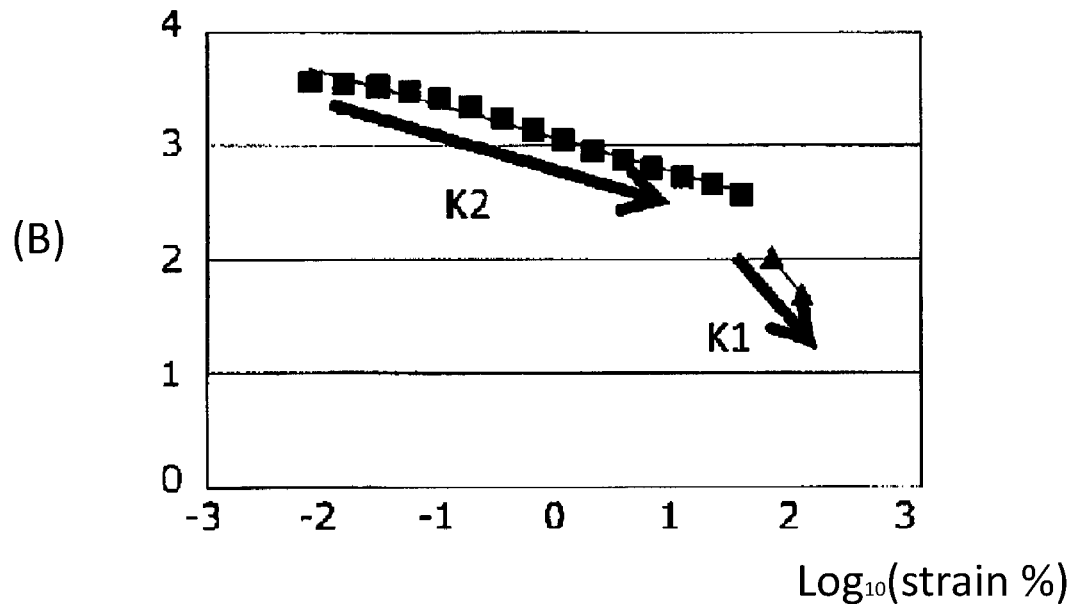
(B)

FIG.2
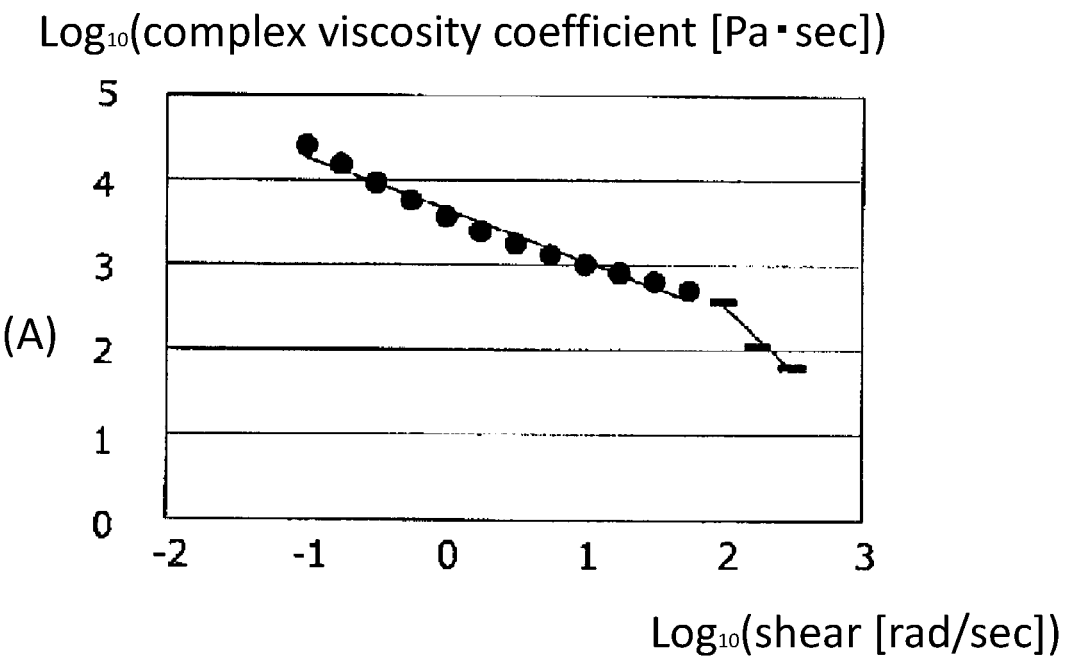
(A)
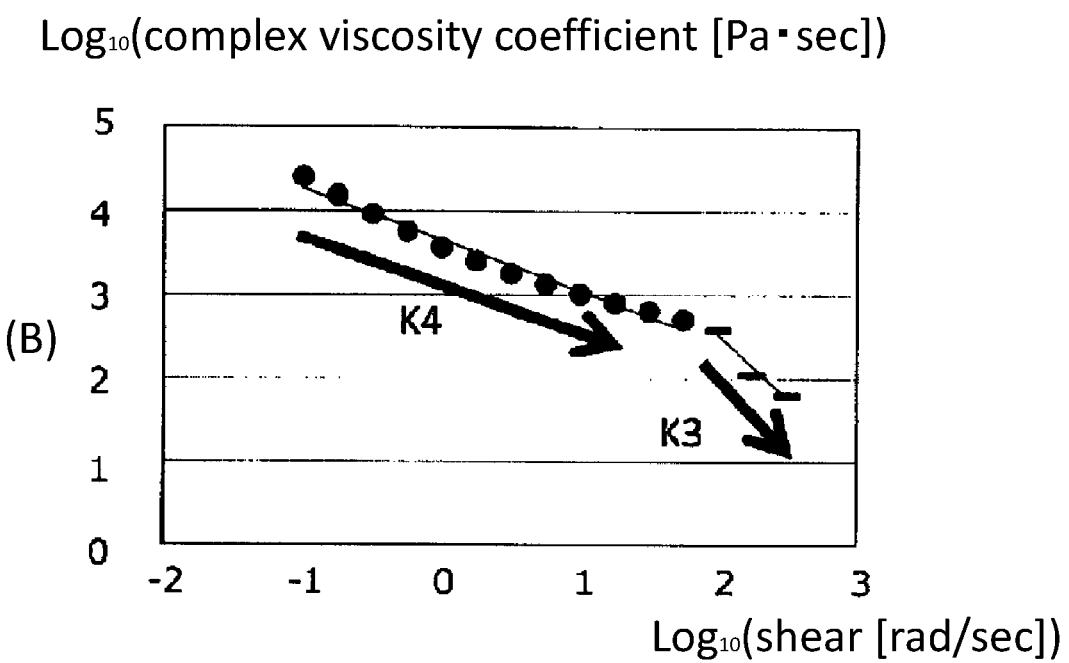
(B)

FIG.3
(a)
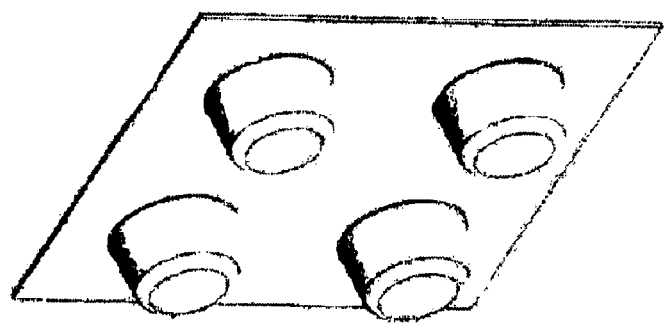
(b)
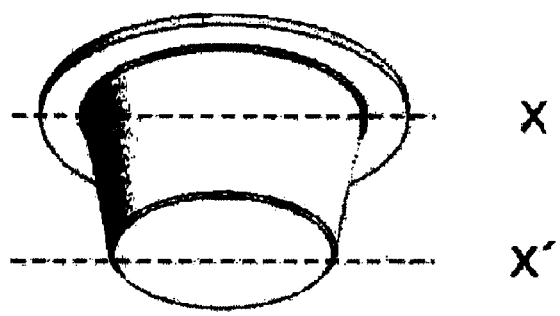
X
X'
(c)
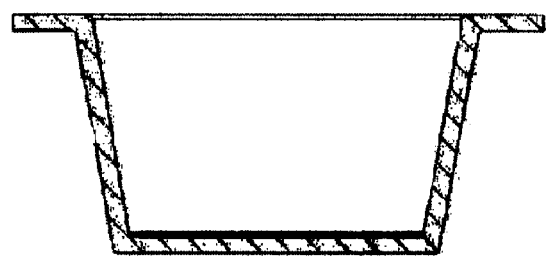

FIG.8
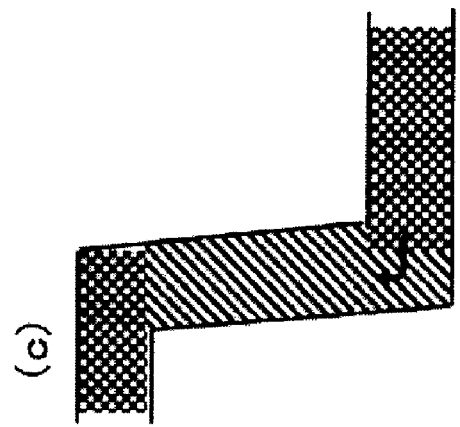
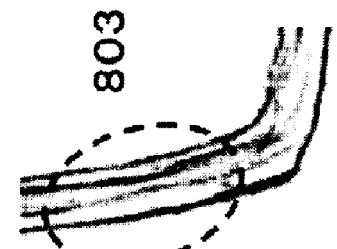
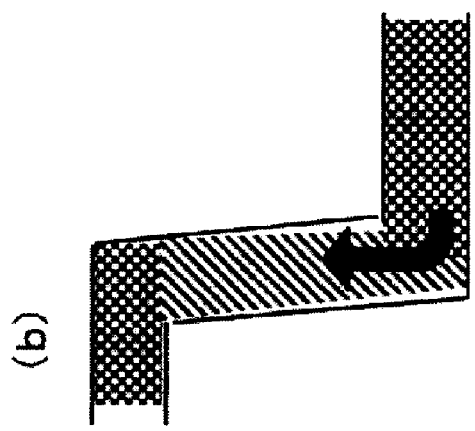
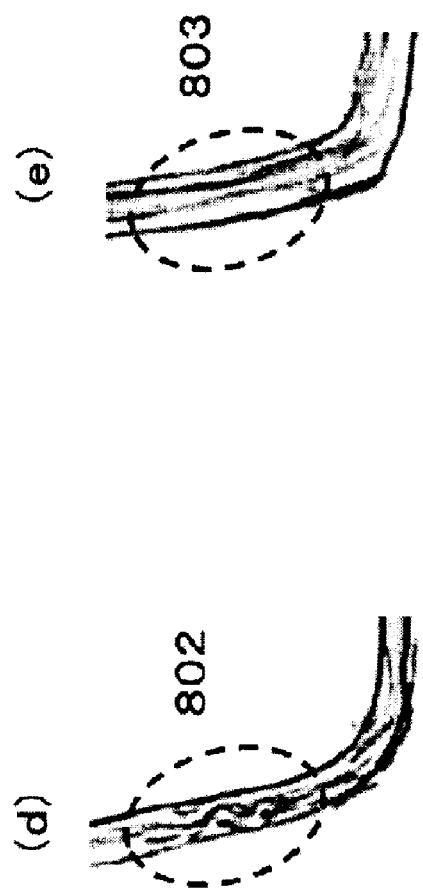
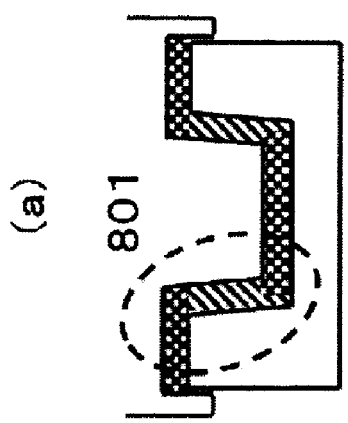

COMPOSITE MATERIAL INCLUDING CARBON FIBERS AND THERMOPLASTIC RESIN, MOLDED BODY PRODUCTION METHOD USING SAME, AND MOLDED BODY

TECHNICAL FIELD

The present invention relates to a composite material including carbon fibers and a thermoplastic resin, and a molded body produced using the composite material. More specifically, the present invention relates to a method for producing the molded body in which the in-plane orientation of the carbon fibers is excellent in a transition section between a vertical plane and a top plane of the molded body, and which can be suitably used for vehicle parts and the like.

BACKGROUND ART

In recent years, a so-called fiber-reinforced resin molded body including a thermoplastic resin and carbon fibers has attracted attention in the mechanical field. Since carbon fibers are dispersed in the thermoplastic resin, these fiber-reinforced resin molded bodies have excellent mechanical properties and are attracting attention as structural members of automobiles and the like. Such members generally include parts that have a vertical plane and a top plane and that are in shapes such as a so-called dimple shape (deep drawing shape), a corrugated shape, or a hat shape.

Patent Literature 1 describes an impact absorbing member, which is molded from a fiber-reinforced composite sheet, made from a thermoplastic resin and reinforcing fibers, includes a flange portion, and in which a ratio of density of a main body portion to density of the flange portion is set at 0.50 to 0.91. It can be said that the impact absorbing member has a dimple shape.

CITATION LIST

Patent Literature

Patent Literature 1: JP-A-6-335934

SUMMARY OF INVENTION

Technical Problem

Patent Literature 1 discloses that an impact absorbing member in which density of the main body portion is smaller than a theoretical value due to being porous is obtained by devising an area and a degree for pressing a fiber-reinforced composite material sheet made from a thermoplastic resin and reinforcing fibers at the time of press-molding the sheet, as described in the present description thereof.

However, in the application of the molded body of the fiber-reinforced composite material, a molded body having no porous portion or a molded body in which density of each portion is uniform may be preferable. Particularly, there is a demand for technical innovation for obtaining a molded body having higher versatility and superior physical properties as a molded body that has a vertical plane and a top plane and that are in a shape such as a dimple shape (deep drawing shape), a corrugated shape, or a hat shape.

An object of the present invention is to provide a molded body that has a vertical plane and a top plane and has higher versatility and superior physical properties, a method for producing the molded body, and a fiber-reinforced composite material that can be used to form the molded body.

Solution to Problem

The inventors have conducted intensive studies to achieve the object, relate to a molded body of a fiber-reinforced composite material which has a vertical plane and a top plane and which is in a shape such as a dimple shape, a corrugated shape, or a hat shape, and have found out that orientation disturbance of reinforcing fibers in a vertical plane portion right leading to the top plane of a dimple-shaped portion, a corrugated portion, a hat-shaped portion or the like has an effect of deteriorating physical properties thereof. Further, the present invention is completed by finding out that it is effective to use a composite material having a specific viscosity as a molding material so as to prevent orientation disturbance of the reinforcing fibers. That is, the present invention is summarized as follows.

1. A composite material including a carbon fiber having a weight average fiber length of 1 mm or more and 100 mm or less and a thermoplastic resin, wherein the composite material satisfies $K1 \leq 1.5 \times K2$.

$K1$ represents an inclination of an approximate straight line obtained by: performing strain sweep tests from 0% to 100% on the composite material at a temperature of 270° C., a shear of 100 rad/sec, and a normal load of 2N; plotting, in double logarithmic scales, the values of strain % versus the values of complex viscosity coefficient Pa·sec in a range of 35% strain or more; and performing linear approximation thereon.

$K2$ represents an inclination of an approximate straight line obtained by: performing strain sweep tests from 0% to 100% on the composite material at a temperature of 270° C., a shear of 100 rad/sec, and a normal load of 2N; plotting, in double logarithmic scales, the values of strain % versus the values of complex viscosity coefficient Pa·sec in a range of less than 35% strain; and performing linear approximation thereon.

2. The composite material according to 1, wherein $K3 \leq 0.95 \times K4$ is satisfied.

$K3$ represents an inclination of an approximate straight line obtained by: performing shear sweep tests from 0 rad/sec to 400 rad/sec on the composite material at a temperature of 270° C., a strain of 30%, and a normal load of 2N; plotting, in double logarithmic scales, the values of shear rad/sec versus the values of complex viscosity coefficient Pa·sec in a range of shear of 100 rad/sec or more; and performing linear approximation thereon.

$K4$ represents an inclination of an approximate straight line obtained by: performing shear sweep tests from 0 rad/sec to 400 rad/sec on the composite material at a temperature of 270° C., a strain of 30%, and a normal load of 2N; plotting in double logarithmic scales, the values of shear rad/sec versus the values of complex viscosity coefficient Pa·sec in a range of shear of 100 rad/sec or more; and performing linear approximation thereon.

3. The composite material according to 1 or 2, wherein a complex viscosity coefficient of the composite material is 1000 Pa·sec or less at a temperature of 270° C., a shear of 100 rad/sec, a strain of 30% and a normal load of 2N.

4. The composite material according to any one of 1 to 3, wherein the thermoplastic resin includes at least two types of a thermoplastic resin X and a thermoplastic resin Y.

5. The composite material according to 4, wherein the thermoplastic resin X is a polyamide-based resin A and the thermoplastic resin Y is a polyarylene ether-based resin B.

6. A molded body production method for producing a molded body having a vertical plane and a top plane, the method comprising press molding the composite material according to any one of 1 to 5.

7. The molded body production method according to 6, wherein the molded body has a dimple shape, a corrugated shape, or a hat shape.

8. A composite material including a thermoplastic resin and a carbon fiber that has a weight average fiber length of 1 mm or more and 100 mm or less, wherein the composite material satisfies K3≤0.95×K4.

K3 represents an inclination of an approximate straight line obtained by: performing shear sweep tests from 0 rad/sec to 400 rad/sec on the composite material at a temperature of 270° C., a strain of 30%, and a normal load of 2N; plotting, in double logarithmic scales, the values of shear rad/sec versus the values of complex viscosity coefficient Pa·sec in a range of shear of 100 rad/sec or more; and performing linear approximation thereon.

K4 represents an inclination of an approximate straight line obtained by: performing shear sweep tests from 0 rad/sec to 400 rad/sec on the composite material at a temperature of 270° C., a strain of 30%, and a normal load of 2N; plotting in double logarithmic scales, the values of shear rad/sec versus the values of complex viscosity coefficient Pa·sec in a range of shear of less than 100 rad/sec; and performing linear approximation thereon.

9. A molded body obtained by press molding the composite material according to any one of 1 to 5.

10. The molded body according to 9 having a vertical plane and a top plane.

Advantageous Effects of Invention

The composite material in the present invention has a low complex viscosity coefficient in an area where high strain and/or shear is applied, and therefore, composite materials exhibit excellent followability during a stretching step in press molding. Accordingly, when a molded body that has a vertical plane and a top plane and that is in a shape such as a dimple shape, corrugated shape or a hat shape is produced, the molded body can be produced without disturbing carbon fiber form of the composite material at a vertical plane portion right above a bent portion (transition section) leading from the vertical plane to the top plane (when carbon fibers contained in the composite material are randomly dispersed in two dimension, the carbon fibers are maintained in a two-dimensional random dispersion state in the molded body, and orientation of the carbon fibers in the plate thickness direction is reduced).

That is, according to the present invention, it is possible to provide a molded body having higher versatility and more excellent physical properties, a method for producing the molded body, and a fiber-reinforced composite material that can be used to form the molded body.

BRIEF DESCRIPTION OF DRAWINGS

FIG. 1(A) illustrates what is obtained by: performing strain sweep tests from 0% to 100% on a composite material at a temperature of 270° C., a shear of 100 rad/sec, and a normal load of 2N; plotting, in double logarithmic scales, values of strain % versus values of complex viscosity coefficient Pa·sec.

FIG. 1(B) schematically shows: an inclination K1 of an approximate straight line obtained by performing linear approximation in a range of not less than 35% strain of the plotting in double logarithmic scales of values of strain % versus values of complex viscosity coefficient Pa·sec; and thereon; and an inclination K2 of an approximate straight line by performing linear approximation in a range of less than 35% strain of the plotting.

FIG. 2(A) illustrates what is obtained by: performing shear sweep tests from 0 rad/sec to 400 rad/sec on a composite material at a temperature of 270° C., a strain of 30% and a normal load of 2N; and plotting, in double logarithmic scales, values of shear rad/sec versus values of complex viscosity coefficient Pa·sec.

FIG. 2(B) schematically shows: an inclination K3 of an approximate straight line obtained by performing linear approximation in a range of shear of 100 rad/sec or more of the plotting in double logarithmic scales of values of shear rad/sec versus values of complex viscosity coefficient Pa·sec; and an inclination K4 of an approximate straight line obtained by performing linear approximation in a range of shear of less than 100 rad/sec of the plotting.

FIG. 3(a) and FIG. 3(b) show molded bodies that are molded using the composite material of the present invention and have a dimple shape.

FIG. 3(c) is a cross-sectional view of the dimple shape in an X-X' cross section as shown in FIG. 3(b).

FIG. 8(a) schematically illustrates a state in FIG. 7(d).

FIG. 8(b) is an enlarged view of a portion 801 in FIG. 8(a) and schematically illustrates that a molded body is being molded into a dimple shape using a conventional composite material.

FIG. 8(c) is an enlarged view of the portion 801 in FIG. 8(a), and schematically illustrates that a molded body is being molded into a dimple shape using a composite material of the present invention.

FIG. 8(d) schematically illustrates a state in which disturbance of fiber orientation occurs right above a transition section leading from a vertical plane to a top plane when a conventional composite material is used to form a molded body having a dimple shape.

FIG. 8(e) schematically illustrates a state in which fiber orientation is not disturbed right above a transition section leading from a vertical plane to a top plane when a composite material of the present invention is used to form a molded body having a dimple shape.

DESCRIPTION OF EMBODIMENTS

Figure 4:
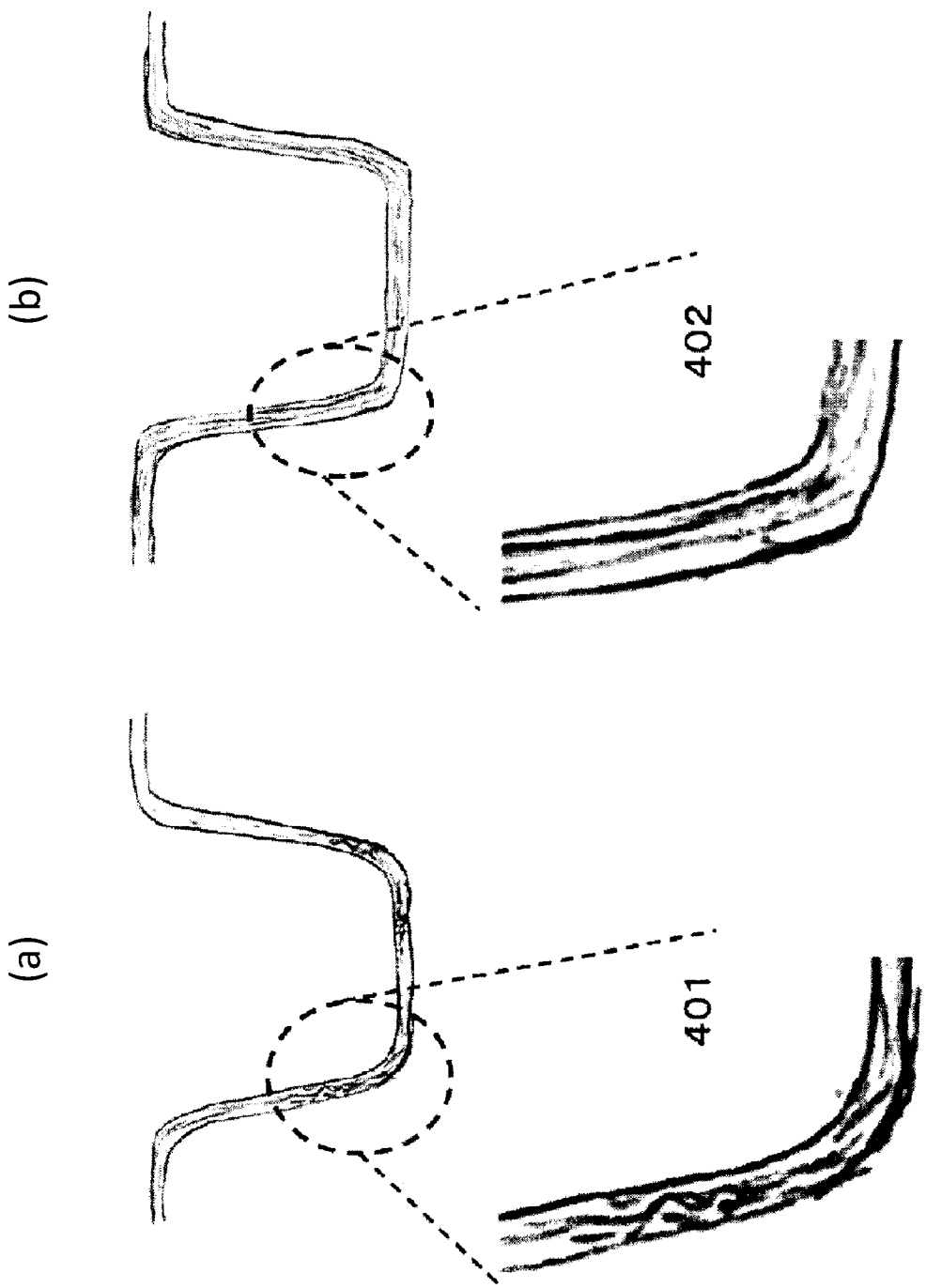
FIG. 4(a) is a cross-sectional view of a molded body when molded using a conventional composite material to form a dimple shape, and schematically illustrates that disturbance of fiber orientation occurs at a vertical plane portion right above a transition section leading from a vertical plane to a top plane.
FIG. 4(b) is a cross-sectional view of a molded body when molded using the composite material of the present invention to form a dimple shape, and schematically illustrates that disturbance of fiber orientation does not occur at a vertical plane portion right above a transition section leading from a vertical plane to a top plane.

Hereinafter, preferred embodiments of the present invention will be described in detail with reference to the accompanying drawings. Regarding the present description of the present invention, mass may be referred to as weight.

The present invention relates to a composite material that includes a carbon fiber having a weight average fiber length of 1 mm or more and 100 mm or less and a thermoplastic resin, and that satisfies K1≤1.5×K2.

K1 represents an inclination of an approximate straight line obtained by: performing strain sweep tests from 0% to 100% on the composite material at a temperature of 270° C., a shear of 100 rad/sec, and a normal load of 2N; plotting, in double logarithmic scales, the values of strain % versus the values of complex viscosity coefficient Pa·sec in a range of not less than 35% strain; and performing linear approximation thereon.

K2 represents an inclination of an approximate straight line obtained by: performing strain sweep tests from 0% to 100% on the composite material at a temperature of 270° C., a shear of 100 rad/sec, and a normal load of 2N; plotting, in double logarithmic scales, the values of strain % versus the values of complex viscosity coefficient Pa·sec in the range of less than 35% strain; and performing linear approximation thereon.

Further, the present invention also relates to a composite material that includes a carbon fiber having a weight average fiber length of 1 mm or more and 100 mm or less and a thermoplastic resin, and that satisfies K3≤0.95×K4.

K3 represents an inclination of an approximate straight line obtained by: performing shear sweep tests from 0 rad/sec to 400 rad/sec on the composite material at a temperature of 270° C., a strain of 30%, and a normal load of 2N; plotting, in double logarithmic scales, the values of shear rad/sec versus the values of complex viscosity coefficient Pa·sec in a range of 100 rad/sec or more; and performing linear approximation thereon.

K4 represents an inclination of an approximate straight line obtained by: performing shear sweep tests from 0 rad/sec to 400 rad/sec on the composite material at a temperature of 270° C., a strain of 30%, and a normal load of 2N; plotting in double logarithmic scales, the values of shear rad/sec versus the values of complex viscosity coefficient Pa·sec in a range of less than 100 rad/sec; and performing linear approximation thereon.

1. Carbon Fiber 1.1 Type of Carbon Fiber

A polyacrylonitrile (PAN)-based carbon fiber, a petroleum/coal pitch-based carbon fiber, a rayon-based carbon fiber, a cellulose-based carbon fiber, a lignin-based carbon fiber, a phenol-based carbon fiber, a vapor grown carbon fiber, and the like, as carbon fibers used in the present invention, are known and any of these carbon fibers can be suitably used in the present invention.

In particular, a polyacrylonitrile (PAN)-based carbon fiber is preferably used in the present invention in view of excellent tensile strength thereof. When a PAN-based carbon fiber is used as the carbon fiber, the tensile modulus of elasticity thereof is preferably in a range of 100 GPa to 600 GPa, more preferably in a range of 200 GPa to 500 GPa, and still more preferably in a range of 230 GPa to 450 GPa. The tensile strength is preferably in a range of 2000 MPa to 10000 MPa, and more preferably in a range of 3000 MPa to 8000 MPa.

1.2 Sizing Agent

The carbon fiber used in the present invention may have a sizing agent attached to a surface thereof. When the carbon fiber to which a sizing agent is attached is used, the type of the sizing agent can be appropriately selected depending on the types of the carbon fiber and the thermoplastic resin, and is not particularly limited.

For example, it is preferable to use terpolymer polyamide particles described in WO2013/133421 as a preferable sizing agent for producing the composite material and the molded body in the present invention. For example, when nylon 6/nylon 66/nylon 12 (weight ratio; 45/15/40 wt %) is used which is a sizing agent described in Example 1 of WO2013/133421, it is particularly preferable that a polyamide-based resin and a polyarylene ether-based resin are used which are preferred embodiments of the present invention.

1.3 Fiber Length

The weight average fiber length of the carbon fibers used in the present invention is 1 mm or more, and is preferably 1 mm or more and 100 mm or less. The weight average fiber length of the carbon fibers is more preferably 3 mm or more and 80 mm or less, and is still more preferably 5 mm or more and 60 mm or less.

When the weight average fiber length is not more than 100 mm, the fluidity of the composite material does not decrease, and a desired molded body shape can be easily obtained at the time of press molding. Meanwhile, when the weight average fiber length is 1 mm or more, the mechanical strength of the molded body is sufficient.

In the case of injection molding using a carbon fiber reinforced composite material, the weight average fiber length of carbon fibers that are contained in an injection-molded article and that present a good appearance is generally less than 1 mm.

Carbon fibers having different fiber lengths may be used in combination in the present invention. In other words, carbon fibers used in the present invention may have a single peak in the weight average fiber length, or may have a plurality of peaks.

For example, the average fiber length of the carbon fibers can be determined based on the following formula (a) by measuring the fiber length of 100 fibers randomly extracted from a molded body to a measurement unit of 1 mm using a caliper or the like.

Assuming that a fiber length of each carbon fiber is Li and a measured number is j, a number average fiber length (Ln) and a weight average fiber length (Lw) are obtained by the following formulas (a) and (b).

$$Ln = \Sigma Li/j \quad \text{Formula (a)}$$

$$Lw = (\Sigma Li^2)/(\Sigma Li) \quad \text{Formula (b)}$$

When the fiber length is a fixed length, the number average fiber length and the weight average fiber length have the same value.

The carbon fibers can be extracted from the molded body, for example, by heating the molded body at 500° C. for an hour and removing the resin in the furnace.

1.4 Fiber Diameter

The fiber diameter of the carbon fibers used in the present invention may be appropriately determined depending on the type of the carbon fibers, and is not particularly limited. The average fiber diameter is preferably in a range of 3 μm to 50 μm, more preferably in a range of 4 μm to 12 μm, and still more preferably in a range of 5 μm to 8 μm. Here, the average fiber diameter refers to a diameter of a single fiber of carbon fiber. Therefore, when the carbon fibers are in the form of a fiber bundle, the average fiber diameter refers to the diameter of one carbon fiber (single fiber) constituting the fiber bundle instead of the diameter of the fiber bundle. The average fiber diameter of the carbon fibers can be measured, for example, by a method described in JIS R7607: 2000.

1.5 Carbon Fiber Volume Fraction

It is preferable that the volume fraction of carbon fibers ("carbon fiber volume fraction", hereinafter, sometimes simply referred to as "Vf"), which are in the composite material or in the molded body obtained from the composite material, defined by the following formula (c) is preferably 3 vol % or more and 60 vol % or less. The carbon fiber volume fraction is more preferably 10 vol % or more and 60 vol % or less, still more preferably 10 vol % or more and 50 vol % or less, further preferably 20 vol % or more and 50 vol % or less, and most preferably 25 vol % or more and 45 vol % or less.

Carbon fiber volume fraction ($Vf$)=100×carbon fiber volume/(carbon fiber volume+thermoplastic resin volume)  Formula (c)

When the carbon fiber volume fraction (Vf) in the composite material or in the molded body obtained therefrom is 3 vol % or more, a desired mechanical property is easily obtained. Meanwhile, when the carbon fiber volume fraction (Vf) in the composite material or in the molded body does not exceed 60 vol %, it is easy to obtain a desired molded body shape since the fluidity thereof is excellent when used for press molding.

1.6 Weight Per Unit Area

The amount of weight per unit area of the carbon fibers in the molded body is not particularly limited, and is generally 25 g/m² or more and 10000 g/m² or less.

1.7 Fiber Form 1.7.1 Fiber Bundle

The carbon fibers contained in the composite material or in the molded body obtained from the composite material contain carbon fiber bundles in the present invention.

Fiber bundles may be contained in the carbon fibers used in the present invention, or single fibers and fiber bundles may coexist therein. The number of single fibers constituting each fiber bundle may be substantially the same or different in each fiber bundle. The number of single fibers constituting each fiber bundle used in the present invention is not particularly limited, and is generally in a range of several to one hundred thousand.

In general, carbon fibers as a raw material are in the form of fiber bundles in which several thousands to several tens of thousands of filaments are aggregated. When carbon fibers are used as they are, an entangled portion of the fiber bundles locally thickens and it may be difficult to obtain a thin molded body. For this reason, it is common to widen or spread the fiber bundles when carbon fibers are used.

With respect to the carbon fibers in the present invention, since the degree of spreading of a fiber bundle is under control, it is preferable to include carbon fiber bundles composed of not less than a specified number of carbon fibers, and more preferable to include carbon fibers (single fibers) or carbon fiber bundles of less than a specified number.

That is, there is no problem when 10 or more carbon fiber single fibers form a carbon fiber bundle.

1.7.2 Random Two-Dimensional Dispersion of Carbon Fibers

The carbon fibers contained in the composite material or in the molded body obtained from the composite material of the present invention, are preferably dispersed randomly in two-dimension with the long axial direction thereof in the in-plane direction of the composite material and the molded body.

Here, being "dispersed randomly in two-dimension" refers to a state in which the carbon fibers are oriented in a disorderly way instead of in a specific direction such as the same direction in the in-plane direction of the composite material and the molded body, and are arranged in a sheet plane as a whole without exhibiting a specific directionality. The composite material and the molded body including discontinuous fibers dispersed randomly in two-dimension are substantially isotropic without in-plane anisotropy.

The in-plane direction of the composite material and the molded body refers to a direction orthogonal to the plate thickness direction of the composite material and the molded body. The longitudinal direction or the width direction refers to a fixed direction, while in-plane direction means unfixed directions in the same plane (parallel plane orthogonal to the plate thickness direction).

The random two-dimensional orientation degree is evaluated by obtaining a ratio of the tensile modulus of elasticity in two directions orthogonal to each other. When a ratio (Eδ) of a large value divided by a small value, among values of the tensile modulus of elasticity measured for a random direction of the composite material and the molded body and for a direction orthogonal thereto, is not more than 2 preferably not more than 1.3, it can be evaluated that the carbon fibers are dispersed randomly in two-dimension.

2. Thermoplastic Resin 2.1 Type of Thermoplastic Resin

The thermoplastic resin is not particularly limited as long as the thermoplastic resin is capable of obtaining a composite material having a desired strength, and can be appropriately selected and used depending on applications or the like of the composite material.

The thermoplastic resin is not particularly limited, and one having a desired softening temperature or melting point can be appropriately selected and used depending on applications or the like of the composite material.

Examples of thermoplastic resins include a polyolefin resin, a polystyrene resin, a thermoplastic polyamide-based resin, a polyester resin, a polyacetal resin (polyoxymethylene resin), a polycarbonate resin, a (meth) acrylic resin, a polyarylate resin, a polyphenylene ether resin, a polyimide resin, a polyether nitrile resin, a phenoxy resin, a polyphenylene sulfide resin, a polysulfone resin, a polyketone resin, a polyether ketone resin, a thermoplastic urethane resin, a fluorine-based resin, a thermoplastic polybenzimidazole resin, and a vinyl resin.

Examples of polyolefin resins include a polyethylene resin, a polypropylene resin, a polybutadiene resin, and a polymethylpentene resin.

Examples of vinyl resins include a vinyl chloride resin, a vinylidene chloride resin, a polyvinyl acetate resin, and a polyvinyl alcohol resin.

Examples of polystyrene resins include a polystyrene resin, an acrylonitrile-styrene resin (AS resin), and an acrylonitrile-butadiene-styrene resin (ABS resin).

Examples of polyamide-based resins include a homopolymer such as polyamide 6, polyamide 11, polyamide 12, polyamide 46, polyamide 56, polyamide 410, polyamide 510, polyamide 66, polyamide 610, polyamide 612, polyamide 1010, polyamide 4T, polyamide 5T, polyamide 5I, polyamide 6T, polyamide 6I, a copolymer of polyamides 4, 6, polyamide 1012, polyamide 9T, polyamide MXD6, and a polyamide (polyamide PACMI) obtained by polymerizing an isophthalic acid and bis (3-methyl-4-aminocyclohexyl) methane, or a copolymer or a mixture thereof.

Examples of polyester resins include a polyethylene terephthalate resin, a polyethylene naphthalate resin, a polybutylene terephthalate resin, a polytrimethylene terephthalate resin, and a liquid crystal polyester. Examples of (meth) acrylic resins include polymethyl methacrylate.

Examples of polyphenylene ether resins include modified polyphenylene ether. Examples of thermoplastic polyimide-based resins include thermoplastic polyimide, a polyamide-imide resin, and a polyetherimide resin. Examples of polysulfone resins include a modified polysulfone resin and a polyether sulfone resin.

Examples of polyetherketone resins include a polyetherketone resin, a polyether ether ketone resin, and a polyetherketoneketone resin. Examples of fluorine-based resins include polytetrafluoroethylene.

With respect to the thermoplastic resin used in the present invention, only one type of the thermoplastic resin may be used, or two or more types of the thermoplastic resins may be used. An embodiment in which two or more types of thermoplastic resins are used in combination may be, for example, one in which thermoplastic resins whose softening temperatures or melting points are different from each other are used in combination, or one in which thermoplastic resins whose average molecular weights are different from each other are used in combination.

2.2 Preferred Thermoplastic Resin

The thermoplastic resin in the present invention preferably contains at least two types of thermoplastic resins, thermoplastic resin X and thermoplastic resin Y.

2.3 More Preferred Thermoplastic Resin

The thermoplastic resin in the present invention preferably contains at least two types of thermoplastic resins, with a polyamide-based resin A as the thermoplastic resin X and a polyarylene ether-based resin B as the thermoplastic resin Y.

2.3.1 Polyamide-Based Resin A

The polyamide-based resin A in the present invention is not particularly limited, and examples thereof include a homopolymer such as polyamide 6, polyamide 11, polyamide 12, polyamide 46, polyamide 56, polyamide 410, polyamide 510, polyamide 66, polyamide 610, polyamide 612, polyamide 1010, polyamide 4T, polyamide 5T, polyamide 5I, polyamide 6T, polyamide 6I, a copolymer of polyamides 4, 6, polyamide 1012, polyamide 9T, polyamide MXD6, and a polyamide (polyamide PACMI) obtained by polymerizing an isophthalic acid and bis(3-methyl-4-aminocyclohexyl) methane, or a copolymer or a mixture thereof.

Among these polyamides, polyamide 6, polyamide 66, polyamide 610, and polyamide 6T are preferably used, and polyamide 6 or polyamide 66 is more preferably used.

With respect to the polyamide-based resin, only one type of the polyamide-based resin may be used, or two or more types of the polyamide-based resins may be used. An embodiment in which two or more types of polyamide-based resins are used in combination may be, for example, one in which polyamide-based resins whose softening temperatures or melting points are different from each other are used in combination, or one in which polyamide-based resins whose average molecular weights are different from each other are used in combination. The embodiment is not limited thereto.

A polyamide derivative can also be used, in which a functional group reactive with a carboxylic acid is introduced on a side chain or a terminal group of the polyamide resin.

In the present description, a polyamide-based resin may be referred to as a PA resin.

2.3.2 Polyarylene Ether-Based Resin B The polyarylene ether-based resin B in the present invention can be obtained by a known production method, and various commercially available polyarylene ether resins can also be used.

The polyarylene ether-based resin is represented by the following formula:

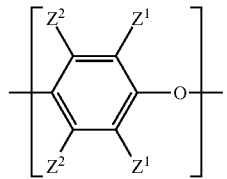

The polyarylene ether-based resin includes repeating structures as shown by the formula, in which each $Z^1$ is independent and is hydrogen, halogen, unsubstituted or substituted C1-C12 hydrocarbyl (however, the hydrocarbyl group is not tert-hydrocarbyl), C1-C12 hydrocarbyl thio, C1-C12 hydrocarbyloxy, or C2-C12 halohydrocarbyloxy, with the halogen and oxygen atoms being separated by at least two carbon atoms, and in which each $Z^2$ is independent and is hydrogen, halogen, unsubstituted or substituted C1-C12 hydrocarbyl (however, the hydrocarbyl group is not tert-hydrocarbyl), C1-C12 hydrocarbyl thio, C1-C12 hydrocarbyloxy, or C2-C12 halohydrocarbyloxy, with the halogen and oxygen atoms being separated by at least two carbon atoms. The polyarylene ether-based resin is not particularly limited to those used as the polyarylene ether-based resin B in the present invention, and may be a polyarylene ether-based resin or a modified polyarylene ether-based resin.

Among these polyarylene ether-based resins, a polyphenylene ether-based resin or a modified polyphenylene ether-based resin is particularly preferred.

With respect to the polyarylene ether-based resin, only one type of the polyarylene ether-based resin may be used, or two or more types of the polyarylene ether-based resins may be used. An embodiment in which two or more types of polyarylene ether-based resins are used in combination may be, for example, one in which polyarylene ether-based resins whose softening temperatures or melting points are different from each other are used in combination, or one in which polyarylene ether-based resins whose average molecular weights are different from each other are used in combination. The embodiment is not limited thereto.

2.3.3 Polyphenylene Ether Resin

When a polyphenylene ether resin is used as the polyarylene ether-based resin B, examples include, but are not particularly limited to, poly(2,6-dimethyl-1,4-phenylene ether), poly(2-methyl-6-ethyl-1,4-phenylene ether), poly(2-methyl-6-phenyl-1,4-phenylene ether), poly(2,6-dichloro-1,4-phenylene ether).

Further, examples of the copolymer of the polyphenylene ether resin include, but are not particularly limited to, those mainly composed of a polyphenylene ether structure, such as a copolymer of 2,6-dimethylphenol and 2,3,6-trimethylphenol, a copolymer of 2,6-dimethylphenol and o-cresol, and a copolymer of 2,3,6-trimethylphenol and o-cresol. In consideration of mechanical strength, a copolymer of poly (2,6-dimethyl-1,4-phenylene ether), 2,6-dimethylphenol and 2,3,6-trimethylphenol, and mixtures thereof are preferred.

One type of the polyphenylene ether resin may be used alone, or two or more types of the polyphenylene ether resins may be used in combination.

The polyphenylene ether resin may also include various other phenylene ether units as partial structures without departing from the desired effects of the present invention. Such phenylene ether units include, but are not limited to, 2-(dialkylaminomethyl)-6-methylphenylene ether units and 2-(N-alkyl-N-phenylaminomethyl)-6-methylphenylene ether units, for example.

Further, the polyphenylene ether may be a modified polyphenylene ether resin obtained by reacting (modifying) a portion or all of polyphenylene ether units with a functionalizing agent that includes: an acyl functional group and one or more selected from a group consisting of a carboxylic acid, an acid anhydride, an acid amide, an imide, an amine, an orthoester, a hydroxy, and an ammonium carboxylate.

In the present description, polyphenylene ether may be referred to as PPE resin.

2.3.4 Mass Ratio of Polyarylene Ether-Based Resin B (Content)

A mass ratio of the polyarylene ether-based resin B with respect to 100 parts by mass of the polyamide-based resin A is preferably 20 parts by mass or more and 300 parts by mass or less. Within this range, the rate of decrease in flexural strength in a high temperature and high humidity range can be preferably suppressed.

The mass ratio of the polyarylene ether-based resin B with respect to 100 parts by mass of the polyamide-based resin A is preferably equal to or more than a lower limit value of 20 parts by mass, more preferably 30 parts by mass or more, still more preferably 50 parts by mass or more, and most preferably 70 parts by mass or more.

The mass ratio of the polyarylene ether-based resin B with respect to 100 parts by mass of the polyamide-based resin A is preferably equal to or less than an upper limit value of 300 parts by mass, more preferably 240 parts by mass or less, still more preferably 200 parts by mass or less, and most preferably 150 parts by mass or less.

2.4 Embodiment Using Thermoplastic Resin Z

The molded body and the composite material in the present invention preferably contain a thermoplastic resin Z, in addition to the polyamide-based resin A and the polyarylene ether-based resin B. One type of the thermoplastic resin Z may be used, or two or more types of the thermoplastic resins Z may be used.

(Type of Thermoplastic Resin Z)

The type of the thermoplastic resin Z in the present invention is not limited. A polystyrene-based resin is preferred.

Examples of polystyrene-based resins include: a homopolymer of styrene or a derivative thereof, a styrene polymer modified by mixing or interacting between natural or synthetic elastomer materials such as polybutadiene, polyisoprene, butyl rubber, EPDM rubber, an ethylene-propylene copolymer, natural rubber, polysulfide rubber, polyurethane rubber and epichlorohydrin, and furthermore, a styrene-containing copolymer such as an acrylonitrile-styrene resin (AS resin), a styrene-butadiene copolymer, a styrene-acrylonitrile-butadiene resin (ABS resin), a styrene-maleic anhydride copolymer, poly-α-methyl-styrene, and a copolymer of ethylvinylbenzene and divinylbenzene. Further, for the present invention, a preferred resin is a polystyrene homopolymer, or a rubber-modified polystyrene that is mixed or grafted with 3 weight % to 30 weight % of polybutadiene rubber or EPDM rubber, preferably 4 weight % to 12 weight %.

With respect to the polystyrene-based resin, only one type of the polystyrene-based resin may be used, or two or more types of the polystyrene-based resins may be used. An embodiment in which two or more types of polystyrene-based resins are used in combination may be, for example, one in which polystyrene-based resins whose softening temperatures or melting points are different from each other are used in combination, or one in which polystyrene-based resins whose average molecular weights are different from each other are used in combination.

In the present description, polystyrene may be referred to as PS resin.

2.5 Mass Ratio of Thermoplastic Resin Z (Content)

When the thermoplastic resin Z is used, a mass ratio of the thermoplastic resin Z with respect to 100 parts by mass of the polyamide-based resin A is preferably equal to or more than a lower limit value of 0.5 parts by mass, more preferably 1 part or more, more preferably 5 parts by mass or more, more preferably 10 parts by mass or more, still more preferably 20 parts by mass or more, particularly preferably 30 parts by mass or more, and most preferably more than 30 parts by mass.

When the thermoplastic resin Z is used, the mass ratio of the thermoplastic resin Z with respect to 100 parts by mass of the polyamide-based resin A is preferably equal to or less than an upper limit value of 300 parts by mass, more preferably 200 parts by mass or less, more preferably 150 parts by mass or less, still more preferably 120 parts by mass or less, particularly preferably 100 parts by mass or less, and most preferably 80 parts by mass or less.

2.6 Compatibilizer

When the thermoplastic resin in the present invention contains a polyamide-based resin A and a polyarylene ether-based resin B, the composite material and the molded body of the present invention preferably contain a compatibilizer. The compatibilizer is not particularly limited as long as the compatibilizer is a compatibilizer of the polyamide-based resin A and the polyarylene ether-based resin B.

The content of the compatibilizer with respect to 100 parts by mass of the polyarylene ether-based resin B is preferably 0.05 parts by mass or more, more preferably 0.1 parts by mass or more, still more preferably 0.2 parts by mass or more, and even more preferably 0.3 parts by mass or more. An upper limit is preferably 10 parts by mass or less, more preferably 8 parts by mass or less, and still more preferably 6 parts by mass or less.

The compatibilizer refers to a polyfunctional compound that interacts with a polyamide-based resin or a PPE resin, or interacts with both. This interaction may be chemical (for example, grafting) or may be physical (for example, to affect surface properties of a dispersed phase).

The type of the compatibilizer is not limited, and a known compatibilizer such as one described in JP-A-11-241017 can be used.

Specifically, at least one selected from citric acid, maleic acid, itaconic acid, isocitric acid, malic acid, fumaric acid, agarose acid, and anhydrides thereof can be used. Preferred are the citric acid, and the maleic acid or anhydride thereof. The maleic acid or anhydride thereof is preferred because the maleic acid or anhydride thereof can dissolve the polyamide and polyphenylene ether at a relatively small amount.

The most preferred is the citric acid. This is because the reaction of functionalizing the polyarylene ether-based resin and the reaction between the functionalized polyarylene ether-based resin and the polyamide-based resin are performed sufficiently and decomposition reaction of the polyamide-based resin is not promoted due to presence of unreacted compatibilizer.

2.7 Other Thermoplastic Resins

When the thermoplastic resin in the present invention contains the polyamide-based resin A and the polyarylene ether-based resin B, the following thermoplastic resins may be additionally used as resins other than the polyamide-based resin A and the polyarylene ether-based resin B (as resins other than the polyamide-based resin A, the polyarylene ether-based resin B and the thermoplastic resin Z when the thermoplastic resin Z is used) as long as the effects of the present invention are not impaired.

Examples thereof include polyolefin-based resins such as a polyethylene resin, a polypropylene resin, a polybutadiene resin, a polymethylpentene resin, a vinyl chloride resin, a vinylidene chloride resin, a polyvinyl acetate resin and a polyvinyl alcohol resin, polyester resins such as a polyethylene terephthalate resin, a polyethylene naphthalate resin, a polybutylene terephthalate resin, a polytrimethylene terephthalate resin and a liquid crystal polyester, a polyacetal resin, a polycarbonate resin, a polyoxymethylene resin, a (meth) acrylic resin such as polymethyl methacrylate, a polyarylate resin, a thermoplastic polyimide resin, a polyamide-imide resin, a polyetherimide resin, a polyether nitrile resin, a phenoxy resin, a polyphenylene sulfide resin, a polysulfone resin, a modified polysulfone resin, a polyether sulfone resin, a polyketone resin, a polyether ketone resin, a polyether ether ketone resin, a polyetherketoneketone resin, a urethane resin, a fluorine-based resin such as polytetrafluoroethylene, and a polybenzimidazole resin.

With respect to the thermoplastic to be used additionally, only one type of the thermoplastic resin may be used, or two or more types of the thermoplastic resins may be used.

An embodiment in which two or more types of thermoplastic resins are used in combination may be, for example, one in which thermoplastic resins having different softening temperatures or melting points from each other are used in combination, or one in which thermoplastic resins having different average molecular weights are used in combination.

3. Other Agents

The molded body and the composite material of the present invention may contain various additives, that is, additives of a flame retardant, a UV resistant agent, a light stabilizer, an antioxidant, a heat stabilizer, a pigment, a release agent, a softening agent, a plasticizer and a surfactant, a thermosetting resin, a filler, a reinforcing fiber other than carbon fiber and nano-additives such as a carbon nanotube and a cellulose nanofiber, as long as the object of the present invention is not impaired.

4. Composite Material

The material for producing the molded body of the present invention is a composite material (the "composite material" described in the present description refers to a material prior to being produced into a molded body).

4.1 Method for Producing Composite Material

The composite material can be produced by a commonly known method. For example, methods described in WO2013/094706 and US2015/0031257 can be used.

4.2 In Case where Polyamide-Based Resin A and Polyarylene Ether Resin B are Contained When the thermoplastic resin in the present invention contains the polyamide-based resin A and the polyarylene ether-based resin B, it is preferable to produce the composite material by the following steps.

4.2.1 Composite Material Production Step 1. Production of Polymer Alloy Components The method of preparing a polymer alloy component (preferably a polymer alloy component to which the thermoplastic resin Z is added) of the polyamide-based resin A and the polyarylene ether-based resin B is not particularly limited, and a known method can be used.

For example, the polyamide-based resin A and the polyarylene ether-based resin B may be kneaded using a twin-screw kneader in a range of 240° C. to 300° C. in the presence of a compatibilizer to produce a pellet-shaped polymer alloy, a film-like polymer alloy or the like.

4.2.2 Composite Material Production Step 2. Production of Composite Material Precursor A carbon fiber bundle may be delivered from a creel and be cut, and a pellet-shaped, fibrous, or powder-like polymer alloy (preferably a polymer alloy to which the thermoplastic resin Z is added) of the polyamide-based resin A and the polyarylene ether-based resin B may be dispersed onto an air-permeable support while diffusing the cut carbon fiber bundles, so as to produce a composite material precursor.

After the cut carbon fiber bundles are diffused and dispersed onto the air-permeable support, the cut carbon fiber bundles may be interposed between film-like polymer alloys (preferably a polymer alloy to which the thermoplastic resin Z is added) of the polyamide-based resin A and the polyarylene ether-based resin B to produce a composite material precursor.

4.2.3 Composite Material Production Step 3. Production of Composite Material

The thermoplastic resin is impregnated into the carbon fiber bundles dispersed onto the composite material precursor by heating to the softening temperature of the thermoplastic resin (preferably, by pressing).

The softening temperature refers to a temperature at which the rigidity of a molded body made from only the thermoplastic resins (polyamide-based resin A and the polyarylene ether-based resin B, or the polyamide-based resin A, the polyarylene ether-based resin B and the thermoplastic resin Z) contained in the composite material cannot be maintained and the molded body deforms easily. The softening temperature is preferably 240° C. or above and below 300° C.

A composite material precursor such as a two-dimensional random array mat and a production method thereof, and a composite material production method (the composite material production steps 2 and 3) are described in detail in descriptions of U.S. Pat. No. 8,946,342 and JP-A-2013-49208.

The thickness of the composite material of the present invention is not particularly limited, and is preferably in a range of 0.01 mm to 100 mm, more preferably in a range of 0.01 mm to 10 mm still more preferably 0.1 mm to 5.0 mm, and still more preferably in a range of 0.1 mm to 3.0 mm.

When the composite material of the present invention has a configuration in which a plurality of layers are laminated, the thickness does not refer to a thickness of each layer, but refers to a thickness of the entire molded body obtained by summing up the thickness of all layers.

5. Complex Viscosity Coefficient of Composite Material

5.1 the Composite Material in the Present Invention Satisfies K1≤1.5×K2.

K1 represents an inclination of an approximate straight line obtained by performing strain sweep tests from 0% to 100% on the composite material at a temperature of 270° C., a shear of 100 rad/sec, and a normal load of 2N, plotting in double logarithmic scales, the values of strain % versus the values of complex viscosity coefficient Pa·sec in a range of not less than 35% strain, and performing linear approximation thereon.

K2 represents an inclination of an approximate straight line obtained by performing strain sweep tests from 0% to 100% on the composite material at a temperature of 270° C., a shear of 100 rad/sec, and a normal load of 2N, plotting in double logarithmic scales, the values of strain % versus the values of complex viscosity coefficient Pa·sec in the range of less than 35% strain, and performing linear approximation thereon.

A strain sweep test is a test depending on strain amplitude (frequency is constant).

In other words, a strain sweep test is a test of strain amplitude dependency, and means that shear is applied at a constant angular velocity (100 rad/sec). Strain 0% to 100% are strain rates when length in a thickness direction of a test piece sandwiched between parallel plates is set to 1.

Shear represents angular velocity and angular frequency as is apparent from unit "rad/sec" (radians per second) thereof.

In the present invention, plotting the values of strain % versus the values of complex viscosity coefficient Pa·sec in double logarithmic scales refers to plotting in double logarithmic scales with the values of strain % as the horizontal axis (x axis) and the values of complex viscosity coefficient Pa·sec as the vertical axis (y axis). The logarithm means a common logarithm, and the common logarithm refers to a logarithm with a base of 10. A linear approximation is preferably a linear approximation by the least squares method.

FIG. 1 shows specific examples in which values obtained by performing strain sweep tests from 0% to 100% at a temperature of 270° C., a shear of 100 rad/sec and a normal load of 2N on the composite material of the present invention are plotted in double logarithmic scales. In FIGS. 1(a) and 1(b), triangular marks plot data of strain 35% or more, and square marks plot data of strain less than 35%. That is, K1 means an inclination of an approximate straight line obtained when performing linear approximation for plots of the triangular marks, and K2 means an inclination of an approximate straight line obtained when performing linear approximation for plots of the square marks.

In a range of strain 35% or more, the composite material has a low viscosity and the shape thereof can be easily changed according to the mold as will be described below. Meanwhile, since the viscosity is maintained at or above a constant value in a range of strain less than 35%, handling property in pre-molding, or the like, is good.

In the case of a prior art composite material, K1>1.5×K2 (the inclination of K1 is less likely to decrease with respect to the inclination of K2) is satisfied.

In the present invention, preferably, K1≤1.6×K2, more preferably, K1≤1.7×K2, more preferably, K1≤2.5×K2, more preferably, K1≤3.5×K2, even more preferably, K1≤4.0×K2, and most preferably, K1≤4.5×K2 is satisfied. Since values of the inclination of K1 and K2 are negative, a narrower range is shown as the coefficient becomes larger.

5.2 the Composite Material of the Present Invention Preferably Satisfies K3≤0.95×K4.

K3 represents an inclination of an approximate straight line obtained by performing shear sweep tests from 0 rad/sec to 400 rad/sec on the composite material at a temperature of 270° C., a strain of 30%, and a normal load of 2N, plotting in double logarithmic scales, the values of shear rad/sec versus the values of complex viscosity coefficient Pa·sec in a range of shear of 100 rad/sec or more, and performing linear approximation thereon.

K4 represents an inclination of an approximate straight line obtained by performing shear sweep tests from 0 rad/sec to 400 rad/sec on the composite material at a temperature of 270° C., a strain of 30%, and a normal load of 2N, plotting in double logarithmic scales, the values of shear rad/sec versus the values of complex viscosity coefficient Pa·sec in a range of shear of 100 rad/sec or more, and performing linear approximation thereon.

A shear sweep test is a test of frequency dependency (strain is constant) and is also referred to as a shear angular frequency sweep test.

In the present invention, plotting the values of shear rad/sec versus the values of complex viscosity coefficient Pa·sec in logarithmic scales refers to plotting in logarithmic scales with the values of shear rad/sec as the horizontal axis (x axis) and the values of complex viscosity coefficient Pa·sec as the vertical axis (y axis). The logarithm means a common logarithm, and the common logarithm refers to a logarithm with a base of 10. A linear approximation is preferably a linear approximation by the least squares method.

FIGS. 2(a) and 2(b) show specific examples in which values obtained when performing shear sweep tests (0 rad/sec to 400 rad/sec) at a temperature of 270° C., a strain 30% and a normal load 2N are plotted in double logarithmic scales. In FIGS. 2(a) and 2(b), K3 means an inclination of an approximate straight line obtained when performing linear approximation for plots of horizontal bar marks, and K2 means an inclination of an approximate straight line obtained when performing linear approximation for plots of round marks.

In a range of shear of 100 rad/sec or more, the composite material has a low viscosity and the shape thereof can be easily changed according to the mold as will be described below. Meanwhile, since the viscosity is maintained at or above a constant value in a range of shear of less than 100 rad/sec, handling property in pre-shaping, for example, is good.

In the present invention, it is preferably K3≤1.1×K4, more preferably, K3≤1.3×K4, more preferably, K3≤1.5×K4, and still more preferably, K3≤2.0×K4. Since values of the inclination of K3 and K4 are negative, a narrower range is shown as the coefficient becomes larger.

6. Molded Body Production Method

The molding of the composite material in the present invention is preferably press molding, and the obtained molded body is preferably a press molded body. That is, compression molding (press molding) using a cold press or a hot press is used as a preferred molding method for producing the molded body of the present invention. When a composite material containing carbon fibers and a thermoplastic resin is molded by injection molding, breakage of the carbon fibers occurs in the molding and the weight average fiber length of the carbon fibers in the molded body is too small, and the mechanical properties of the molded body may become insufficient. However, such problems hardly occur when the compression molding is used. Therefore, the average fiber length (preferably the weight average fiber length) of the reinforcing fibers in the molded body obtained by compression molding can be regarded as the average fiber length of the reinforcing fibers in the composite material used for compression molding.

6.1 Cold Pressing Method

In a cold pressing method, for example, the composite material heated to a first predetermined temperature is put into a mold set to a second predetermined temperature, and then subjected to pressing and cooling. That is, the cold pressing method includes at least the following steps A-1) to A-3).

Step A-1) A step of heating the composite material to a softening temperature or higher of the thermoplastic resin contained in the composite material.

Step A-2) A step of disposing the heated composite material obtained in step A-1) in a mold whose temperature is adjusted to be lower than the softening temperature of the thermoplastic resin.

Step A-3) A step of pressing and molding the composite material disposed in the mold in step A-2).

Molding of the composite material can be completed by performing these steps. When press molding is performed using the cold pressing method, there is an advantage that the molding time is short compared to a hot pressing method described below. On the other hand, the composite material is less likely to flow and the shapability is deteriorated since the temperature of the mold is low.

6.2 Hot Pressing Method

The hot pressing method includes at least the following steps B-1) to B-3).

Step B-1) A step of disposing the composite material in a mold

Step B-2) A step of heating the mold to a softening temperature or higher of the thermoplastic resin and pressing the mold Step B-3) A step of adjusting the temperature of the mold to be lower than the softening temperature of the thermoplastic resin

6.3 Common Matters for Both Pressing Methods

When put into a mold, a single sheet (one sheet) or a plurality of sheets of the composite material is used in accordance with a plate thickness of a target molded body. When a plurality of sheets is used, a plurality of sheets may be laminated in advance and heated. The heated composite material may be put into the mold after being laminated. The heated composite material may be laminated sequentially into the mold. The temperature difference between the lowermost composite material layer and the uppermost composite material layer in the case of lamination is preferred to be small. In view of this, it is preferred to laminate the composite material before putting the composite material into the mold.

These steps need to be performed sequentially as described above, and may include other steps therebetween. Other steps are, for example, pre-shaping steps of pre-shaping in a shape of a cavity of the mold by using the mold and another shaping device used in step A-3) or step B-2), before step A-3) or step B-2).

The steps A-3) and B-2) are steps in which molded bodies in a desired shape are obtained by applying pressure to the composite material. The molding pressure at this time is not particularly limited, and is preferably less than 30 MPa, more preferably not more than 20 MPa, and even more preferably not more than 10 MPa.

Figure 6:
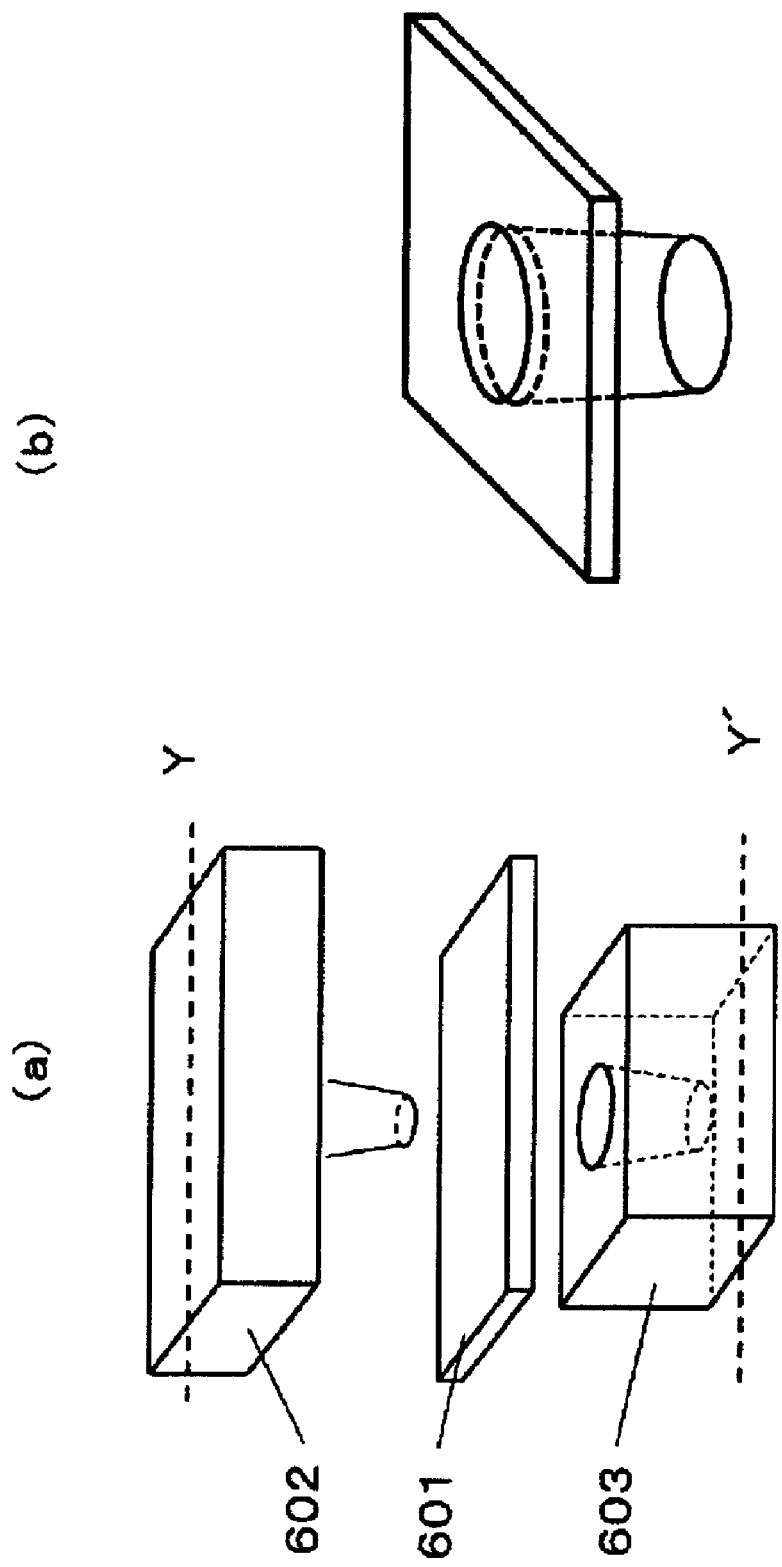
FIG. 6(a) schematically illustrates a composite material and a mold for molding a composite material in a dimple shape.
FIG. 6(b) schematically illustrates a finished molded body in a dimple shape.

Naturally, various steps may be inserted between the above steps during press molding. For example, vacuum compression molding may be used in which press molding is performed in vacuum. As an example, a composite material is indicated by 601 in FIG. 6(a), and an upper mold and a lower mold of the molds are indicated by 602 and 603 respectively in FIG. 6(a). An obtained molded body is in a shape as shown in FIG. 6(b).

6.4 Stretching Step and Flow Step During Molding

The molding step can be further divided into a stretching step and a flow step. More specifically, the stretching step and the flow step are in "Step A-3) A step of pressing and molding the composite material disposed in the mold in step A-2)" in case of the cold pressing method, and "Step B-2) A step of heating the mold to a softening temperature or higher of the thermoplastic resin and pressing the mold" in case of the hot pressing method.

Figure 7:
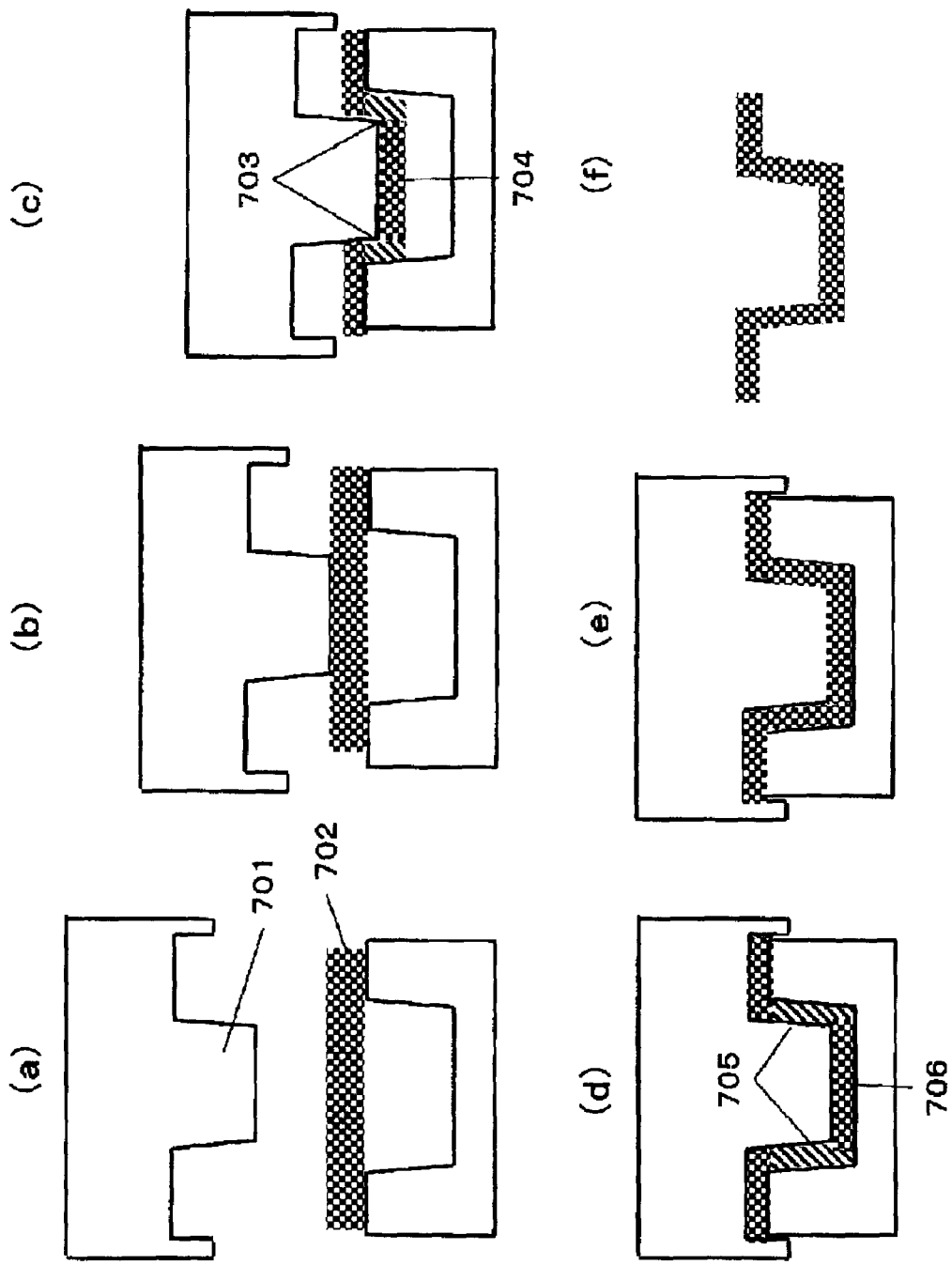
FIG. 7(a) to FIG. 7(f) schematically illustrate a state of press molding (compression molding) in producing a molded body having a dimple shape, and show cross sections taken along Y-Y' of FIG. 6.

Hereinafter, the present invention will be described with reference to FIG. 7, but the present invention is not limited thereto. FIG. 7 is a production step as viewed from a Y-Y' cross section of FIG. 6(a). FIG. 6(a) schematically shows a composite material (601 in FIG. 6(a)) for molding into a dimple shape, an upper mold (602 in FIG. 6(a)) and a lower mold (603 in FIG. 6(a)) of a mold. FIG. 6(b) schematically shows a molded body in a dimple shape after the composite material of FIG. 6(a) is molded.

6.4.1 Start and End of Stretching Step and Flow Step

The stretching step starts when a part of the upper mold of the molds (for example, a protruding portion of 701 in FIG. 7(a)) comes into contact with the composite material (702 in FIG. 7(a)), and ends at the time the flow step starts. The flow step starts when pressure is observed by a pressure gauge of a molding machine. That is, FIGS. 7(b) to 7(c) of are stretching steps. A pressure is observed by a pressure gauge of the mold in FIG. 7(d), and the flow step starts. In FIG. 7(e), the flow step is completed. When the mold is opened, a molded body as shown in FIG. 7(f) can be taken out.

6.4.2 Followability of Composite Material

The followability of the composite material refers to a degree of followability to the mold when the composite material sandwiched between the upper mold and lower mold is pulled and stretched by the upper mold.

The inventors consider phenomena of the present invention as follows.

The composite material enters a concave portion of the lower mold while being pushed by the protruding portion, after a tip end of the protruding portion of the mold (701 in FIG. 7(a)) comes into contact with the composite material. 703 in FIG. 7(c) denotes a stretched composite material. At this time, with the conventional composite material being used, since viscosity at strain 35% or above is relatively high (that is, $K1 \leq 1.5 \times K2$ is not satisfied) when the strain sweep test is performed at a temperature of 270° C., a shear of 100 rad/sec and a normal load 2N, most of the composite material is pulled into the concave portion of the lower mold by the protruding portion of the upper mold (volume of 704 in FIG. 7(c) increases). Meanwhile, a portion (703 in FIG. 7(c)) where a vertical plane is formed is formed while the composite material is stretched. With the conventional composite material being used, a difference of volume fractions of the composite material present in a specific cavity space with respect to the volume of the specific cavity space between the portion 703 in FIG. 7(c) and the portion 704 in FIG. 7(c) (which may be referred to as volume fraction difference in the present invention) is relatively large (volume fraction difference between 705 and 706 in FIG. 7(d) is also large). As a result, the composite material largely flows from a portion pulled into the concave portion of the lower mold to the portion where the vertical plane is formed (a large arrow shown in FIG. 8(b)) by the protruding portion of the upper mold in the flow step after completion of the stretching step. Accordingly, the flowed composite material undulates at an area right above a transition section leading from the vertical plane to the top plane. It can be seen that fiber orientation is disturbed when a cross section of the produced molded body is observed (802 in FIG. 8(d)). That is, there is a problem that the carbon fiber form in the composite material and the carbon fiber form in the molded body are different. FIGS. 8(b) and 8(c) are enlarged views of 801 in FIG. 8(a). FIG. 8(a) illustrates a stage when a pressure is observed by a pressure gauge of the mold and the flow step starts, as in FIG. 7(d).

On the other hand, the composite material of the present invention satisfies K1≤1.5×K2, which means that the viscosity of the composite material at strain 35% or above is relatively low. Therefore, although the composite material is pulled into the concave portion of the lower mold by the tip end of the protruding portion (701 in FIG. 7(a)) of the mold, the composite material present at 704 in FIG. 7(c) is stretched while 703 in FIG. 7(c) is formed in the stretching step. That is, the volume fraction difference between the portion where the top plane is formed and the portion where the vertical plane is formed (the volume fraction difference between 703 and 704 in FIG. 7(c) or the volume fraction difference between 705 and 706 in FIG. 7(d)) is smaller than that when a conventional composite material is used. In the present invention, a phenomenon that a difference of the volume fractions of the composite material present in a specific cavity space with respect to the volume of the specific cavity space between the portion forming the top plane and the portion forming the vertical plane (volume fraction difference) becomes small means that the composite material has good followability.

As a result, the composite material hardly flows between the portion where the top plane is formed and the portion where the vertical plane is formed (a small arrow shown in FIG. 8(c)). As a result, disturbance of fiber orientation is hardly observed in the cross section of the molded body (FIG. 8(e)).

The carbon fibers are also easily dispersed randomly in two-dimensions in the area right above the transition section leading from the vertical plane to the top plane in the molded body when the carbon fibers contained in the composite material are dispersed randomly in two-dimensions, since the carbon fiber form in the composite material is easily maintained in the molded body.

In particular, these problems become more challenging when the molding pressure is low. With respect to a conventional composite material with a high viscosity, the composite material of a vertical plane forming portion is insufficient and a void is left, when the molding pressure is low because a large volume fraction difference appears before the start of the flow step at the top plane forming portion and the vertical plane forming portion in the stretching step. In order to eliminate the volume fraction difference and the void, it is necessary to perform the flow step at a certain pressure. However, an increase in the molding pressure causes the size of equipment and the cost to increase.

On the other hand, a void is not generated even at a low molding pressure as compared with the conventional composite material since the composite material of the present invention has a property of being stretched easily at the time of stretching.

Further, the inventors also consider as follows.

Since the composite material of the present invention satisfies K1≤1.5×K2 (this means that the viscosity of the composite material at strain 35% or above is relatively low compared to that in the related art) and carbon fibers having a weight average fiber length of 1 mm or more and 100 mm or less can be stretched while moving in a direction parallel to the stretching direction, the inventors presume that the fiber orientation is not disturbed even during the stretching step. Therefore, it is considered that the fiber disturbance during molding can be effectively suppressed when the composite material of the present invention is used at an area where the fibers are easily disturbed in the stretching step.

7. Molded Body 7.1 Shape of Molded Body

The composite material of the present invention can be suitably used in producing a molded body having a vertical plane and a top plane by press molding. Examples of molded bodies having a vertical plane and a top plane include, but are not limited to, the dimple-shaped ones shown in FIG. 3. Examples of molded bodies having a vertical plane and a top plane include one in a hat shape and one in a corrugated shape.

The molded body having a vertical plane and a top plane may be press molded using a mold having a corresponding vertical plane and top plane. A molded body having a dimple shape, a corrugated shape or a hat shape is preferred to be produced by press molding using a mold having a corresponding dimple shape, corrugated shape, or hat shape.

7.2 Carbon Fiber Orientation of Vertical Plane Portion in the Vicinity of Transition Section of Molded Body When a molded body is produced by press molding a composite material into a plate shape, there is no stretching step but a flow step only. Therefore, even when a conventional composite material is used, the orientation of fibers contained in the composite material is approximately maintained even after the molded body is produced.

Figure 9:
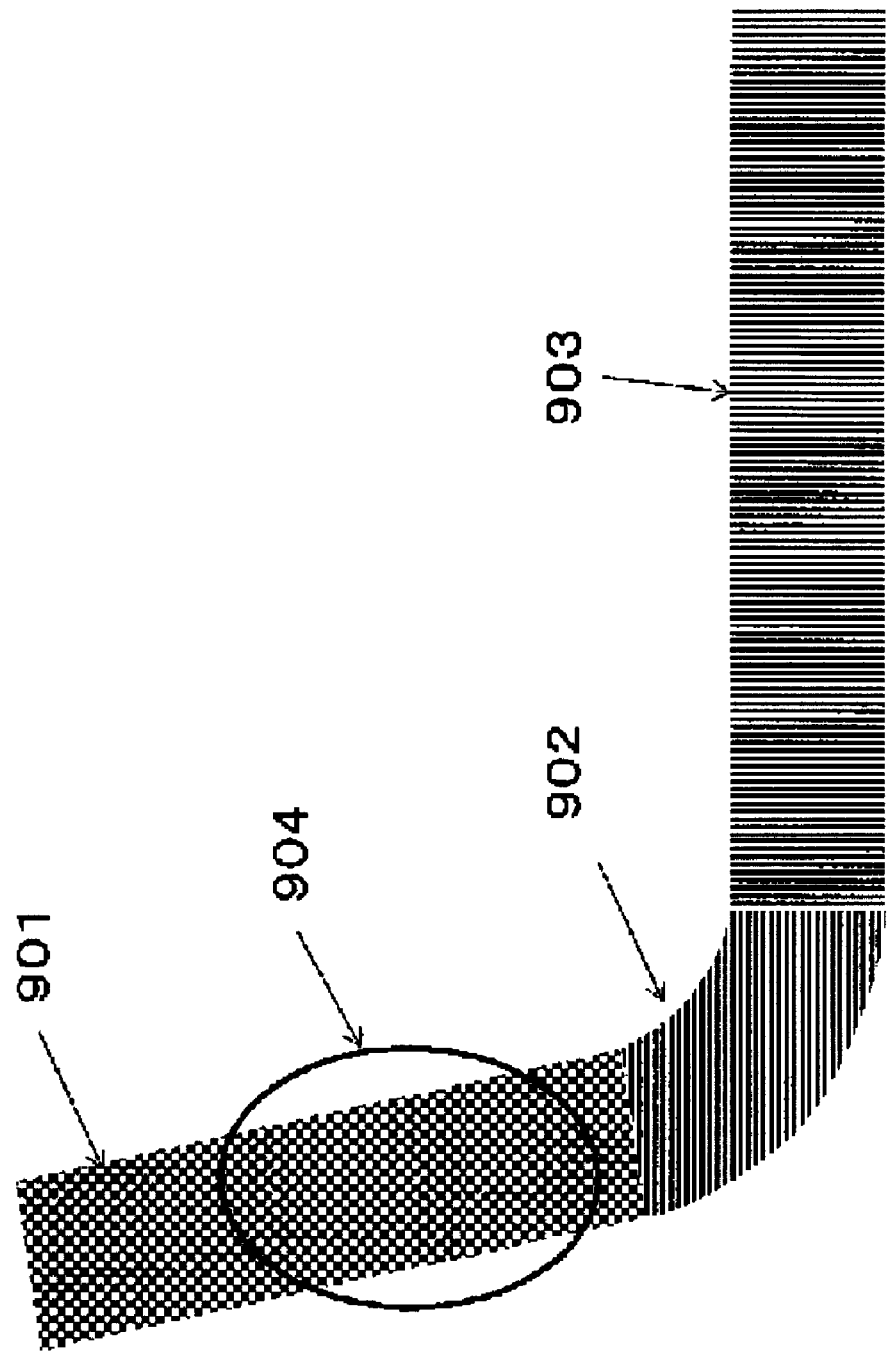
FIG. 9 schematically portrays a top plane, a vertical plane, a transition section and a vertical plane portion right above the transition section leading from the vertical plane to the top plane of a molded body.

However, the orientation of the carbon fibers is easily disturbed when a molded body having a shape like a corrugated shape, a hat shape and a dimple shape is produced in which a vertical plane is formed by stretching the composite material in the stretching step. That is, the disturbance of fiber orientation is observed in a cross section of a vertical plane portion right above a transition section of a bent portion leading from a vertical plane to a top plane, when a conventional composite material is used. FIG. 9 schematically shows a vertical plane 901, a transition section 902 and a top plane 903. 904 in FIG. 9 is a vertical plane portion right above a bent portion (transition section) leading from the vertical plane to the top plane.

Figure 5:
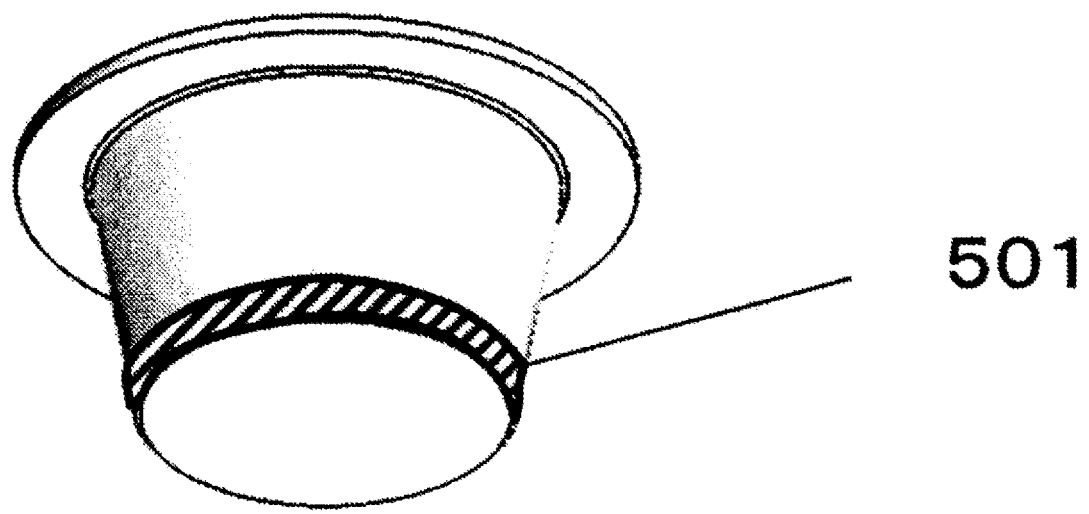
FIG. 5 schematically illustrates a portion where orientation of carbon fibers is likely to be disturbed. This is the case where the molding is performed by contacting a lower side of a paper surface with a lower mold.

When disturbance of fiber orientation is observed in the cross section of the vertical plane portion right above the transition section, a problem is likely to arise that target physical properties cannot be obtained. When a conventional composite material is used in molding, it can be confirmed by observing the cross section that the fibers are oriented in a plate thickness direction and turn into a wavy shape in a portion 401 as shown in FIG. 4(a) or an area such as 501 in FIG. 5, for example. On the other hand, a molded body having a cross section as shown by 402 in FIG. 4(b) is obtained when the composite material of the present invention is used. FIG. 5 indicates that the fibers are likely to be oriented in the plate thickness direction in such an area as 501 when a dimple shape in FIG. 5 is formed with a lower mold of the molds positioned at a lower side of the drawing. A molded body having a cross section as shown by 402 in FIG. 4(b) may exhibit a tensile strength 1.5 times to 2 times of that of a molded body having a cross section as shown by 401 in FIG. 4(a).

With respect to a method for measuring a tensile strength of a molded body obtained from a composite material of the present invention, it is exemplified that a tensile test with reference to JIS K 7164: 2005 is performed using a test piece cut out from an appropriate portion of the molded body, such as a vertical plane portion right above a bent portion (transition section) leading from a vertical plane to a top plane. Examples of tensile testing machines include an Instron 5982 universal testing machine. The test piece is preferably a type A test piece. Conditions of an inter-chuck distance of 115 mm and a test speed of 2 mm/min are exemplified.

7.3 Thickness of Molded Body

The thickness of the molded body of the present invention is not particularly limited, and is preferably in a range of 0.01 mm to 100 mm, more preferably in a range of 0.01 mm to 10 mm, still more preferably 0.1 mm to 5.0 mm, and still more preferably in a range of 0.1 mm to 3.0 mm.

When the molded body of the present invention has a configuration in which a plurality of layers are laminated, the thickness does not refer to a thickness of each layer, but refers to a thickness of the entire molded body obtained by summing up the thickness of all layers.

The molded body used in the present invention may have a single-layer structure formed of a single layer, or may have a laminated structure in which a plurality of layers are laminated.

Examples of modes in which the molded body has the laminated structure include one in which a plurality of layers having the same composition may be laminated, or one in which a plurality of layers having different compositions may be laminated.

EXAMPLES

Hereinafter, the present invention will be described in detail with reference to examples, but the present invention is not limited thereto.

1. Raw materials, which are used in the following production examples and examples, are as follows unless otherwise specified in all the production examples and examples. The decomposition temperature is a measurement result of thermogravimetric analysis.

PAN-Based Carbon Fiber

Carbon fiber "TENAX" (registered trademark) STS40-24KS (average fiber diameter 7 μm) manufactured by Toho Tenax Polyamide 6

The Polyamide 6 may be abbreviated as PA6 resin, which is a crystalline resin having a melting point of 225° C. and a decomposition temperature of 300° C. (in air). A1030 manufactured by Unitika Ltd is used.

Polyamide 66

The Polyamide 66 may be abbreviated as PA66 resin, which is a crystalline resin having a melting point of 263° C. and a decomposition temperature of 300° C. (in air). E2000 manufactured by Unitika Ltd is used.

Polyphenylene Ether The Polyphenylene ether may be abbreviated as PPE resin, which is an amorphous resin having a glass transition temperature of 205 to 215° C. PPO630 of SABIC Innovation Plastics (which may be abbreviated as SABIC below) is used.

Polystyrene The polystyrene may be abbreviated as PS resin, which is an amorphous resin having a glass transition temperature of 95° C. to 100° C. SGP10 manufactured by PS Japan is used.

Compatibilizer

Citric acid (food additive) manufactured by Wako Pure Chemical Industries, Ltd

2. Each value in this example is determined by the following method.

(1) Analysis of Carbon Fiber Volume Fraction (Vf)

A molded body is burned in a furnace at 500° C. for 1 hour to remove the thermoplastic resin. The mass of carbon fibers and the thermoplastic resin is calculated by weighing the mass of the sample before and after the treatment. Next, volume fractions of the carbon fibers and the thermoplastic resin are calculated using specific gravity of each component.

$$Vf = 100 \times \text{carbon fiber volume}/(\text{carbon fiber volume} + \text{thermoplastic resin volume}) \quad \text{Formula (c)}$$

(2) Analysis of Weight Average Fiber Length of Carbon Fibers Contained in Molded Body The molded body is burned at 500° C. for about 1 hour in a furnace to remove the thermoplastic resin. Then the length of 100 randomly extracted carbon fibers is measured using a caliper to a measurement unit of 1 mm and recorded. The weight average fiber length (Lw) is determined by the following formula based on measured lengths of all the carbon fibers (Li, here, i is any integer from 1 to 100).

$$Lw = (\Sigma Li^2)/(\Sigma Li) \quad \text{Formula (b)}$$

The weight average fiber length of the carbon fibers contained in the composite material can also be measured using the same method as described above.

(3) Dynamic Viscoelasticity Measurement

Strain Sweep

A composite material prepared on a parallel plate of 20 mm in diameter under a nitrogen atmosphere is sandwiched using a Rheometer ARES manufactured by TA Instruments, and is subjected to a strain sweep test from a strain amount of 0% to 100% at a normal load of 2N, a shear of 100 rad/sec and an atmosphere temperature of 270° C. Based on the obtained results, values of strain % and complex viscosity coefficient Pa·sec are plotted in double logarithmic scales. An inclination of an approximate straight line of not less than strain 35% is K1, and an inclination of an approximate straight line of less than strain 35% is K2. The approximate straight lines are obtained based on linear approximation using the least squares method.

Shear Sweep

A composite material prepared on a parallel plate of 20 mm in diameter under a nitrogen atmosphere is sandwiched using a Rheometer ARES manufactured by TA Instruments, and is subjected to a strain sweep test from a shear of 0 rad/sec to 400 rad/sec at a normal load of 2N, a strain of 30% and an atmosphere temperature of 270° C. Based on the obtained results, values of shear and complex viscosity coefficient Pa·sec are plotted in double logarithmic scales. An inclination of an approximate straight line of shear of 100 rad/sec or more is K3, and an inclination of an approximate straight line of shear of less than 100 rad/sec is K4. The approximate straight lines are obtained based on linear approximation using the least squares method.

(4) Evaluation of Void in the Vicinity of Vertical plane from Transition Section and Evaluation of Carbon Fiber Form A molded body having a dimple shape as shown in FIG. 3(b) is prepared and is cut along the X-X' cross section of FIG. 3(b), as will be described below. Cross sections of a top plane and a vertical plane are observed.

(4-1) Evaluation of Void

Excellent: No void is observed in an area right above a transition section leading from the vertical plane to the top plane.

Bad: There is a void in the area right above the transition section leading from the vertical plane to the top plane.

(4-2) Evaluation of Carbon Fiber Form (Disturbance of Fiber Orientation)

Excellent: No disturbance of fiber orientation is observed in an area right above a transition section leading from the vertical plane to the top plane.

Good: Only slight disturbance of fiber orientation is observed in the area right above the transition section leading from the vertical plane to the top plane.

Bad: Disturbance of fiber orientation is observed in the area right above the transition section leading from the vertical plane to the top plane.

(5) Cold Pressing Conditions

In order to prepare and evaluate a molded body, cold pressing is performed. The cold pressing conditions are as follows.

The composite material is dried at 120° C. for 4 hours by a hot air dryer and then heated to 290° C. by an infrared heater. A mold for mirror finish is set to 150° C. The heated composite material is introduced into the mold and is pressed at a pressing pressure of 20 MPa or 5 MPa for 1 minute, thereby obtaining a molded body.

Example 1

<Production Step of Composite Material 1. Production of Polymer Alloy Component>

A polyamide 6 resin (nylon 6 resin) A1030 manufactured by Unitika Ltd and a PPO630 resin (poly(2,6-dimethyl-1,4-phenylene ether), PPE resin) manufactured by SABIC are prepared as thermoplastic resins. 100 parts by mass of the PPE resin with respect to 100 parts by mass of the polyamide 6, and 1 part by mass of citric acid produced by Wako Pure Chemical Industries, Ltd with respect to 100 parts by mass of the PPE resin, are mixed and put into a kneader (model TEM-26SS manufactured by Toshiba Machine Co., Ltd) to be kneaded at 280° C., a feed amount of 20 kg/h, and a screw speed of 200 rpm. Thereby, polymer alloy components are prepared.

<Production Step of Composite Material 2. Production of Composite Material Precursor>

Based on Example 1 described in WO2013/133421 pamphlet, a terpolymer polyamide sizing solution of nylon 6/66/12 is prepared.

In the bath of the sizing solution, an un-sized carbon fiber strand (registered trademark "Tenax STS40-24KS" manufactured by Toho Tenax) is continuously immersed, and an emulsion is impregnated between the filaments. The strand is passed through a drying oven at 120° C. to 150° C. for about 120 seconds and is dried to obtain a carbon fiber bundle having a width of 10 mm and a thickness of 0.162 mm.

The prepared polymer alloy components and carbon fiber bundle are used. Based on the method described in U.S. Pat. No. 8,946,342, the carbon fiber volume fraction is calculated to be 35 Vol %, the carbon fibers and the resin of the polymer alloy components are adjusted, and a composite material precursor in which the carbon fibers are dispersed randomly in two-dimension is prepared. The weight average fiber length is adjusted to be 20 mm.

<Production Step of Composite Material 3. Production of Composite Material>

The obtained composite material precursor is heated at 0.5 MPa for 3 minutes in a pressing device heated to 260° C., thereby obtaining a composite material having a targeted thickness of 2.6 mm.

<Production of Molded Body (Cold Press Molding)>

The obtained composite material is cold pressed at 20 MPa or 5 MPa in the press device after being overheated to 290° C. to obtain a molded body shown in FIG. 3(b). The molded body has a vertical plane and a top plane. The results are shown in Table 1.

Example 2

A composite material is prepared and a press molded body is produced by cold press molding, which is performed in the same manner as that in Example 1, except that polymer alloy components (thermoplastic resin) used in the composite material are prepared as follows. The results are shown in Table 1.

A polyamide 6 resin A1030 manufactured by Unitika Ltd, a PPO630 resin (poly(2,6-dimethyl-1,4-phenylene ether), PPE resin) manufactured by SABIC, and a polystyrene resin SGP10 (which may be described as PS resin) manufactured by PS Japan are prepared as thermoplastic resins. 50 parts by mass of the PPE resin with respect to 100 parts by mass of the polyamide 6, 50 parts by mass of the PS resin, and 3 parts by mass of citric acid (food additive) produced by Wako Pure Chemical Industries, Ltd with respect to 100 parts by mass of the PPE resin, are mixed and put into a kneader (model TEM-26SS manufactured by Toshiba Machine Co., Ltd) to be kneaded at 280° C., a feed amount of 20 kg/h, and a screw speed of 200 rpm. Thereby, polymer alloy components are prepared.

Example 3

A composite material is prepared and a press molded body is produced by cold press molding, which is performed in the same manner as that in Example 2, except that the polyamide 6 resin of Example 2 is replaced by a polyamide 66 resin E2000 manufactured by Unitika Ltd.

The results are shown in Table 1.

Comparative Example 1

A composite material is prepared and a press molded body is produced by cold press molding, which is performed in the same manner as that in Example 1. A thermoplastic resin used in the composite material is a polyamide 6 resin A1030 manufactured by Unitika Ltd. The results are shown in Table 1.

Example 4

Figure 10:
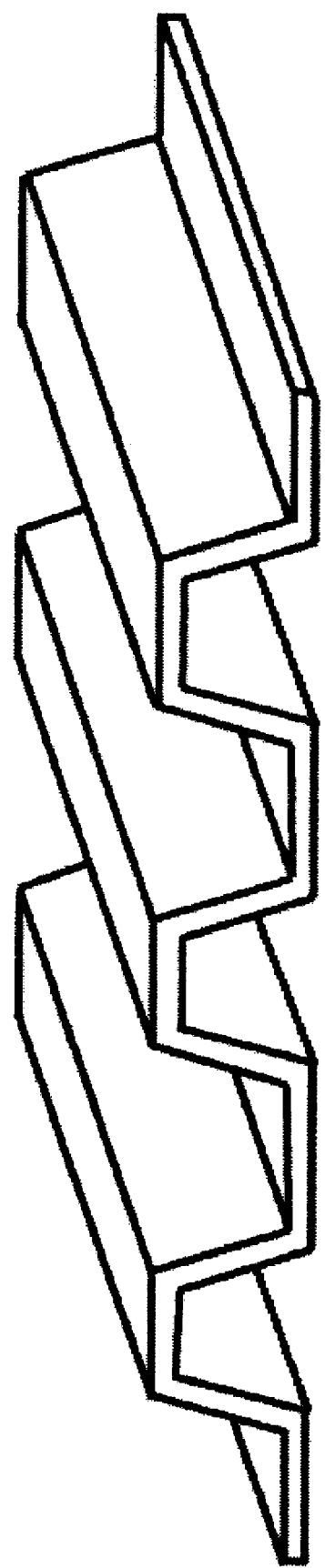
FIG. 10 schematically illustrates an example of a molded body having a corrugated shape.

A molded body in a corrugated shape shown in FIG. 10 is obtained using the same composite material and under the same press conditions as that in Example 1, except that the mold used is changed. The results are shown in Table 2.

Example 5

A molded body in a corrugated shape shown in FIG. 10 is obtained using the same composite material and under the same press conditions as that in Example 2, except that the mold used is changed. The results are shown in Table 2.

Example 6

A molded body in a corrugated shape shown in FIG. 10 is obtained using the same composite material and under the same press conditions as that in Example 3, except that the mold used is changed. The results are shown in Table 2.

Comparative Example 2

A molded body in a corrugated shape shown in FIG. 10 is obtained using the same composite material and under the same press conditions as in Comparative Example 1, except that the mold used is changed. The results are shown in Table 2.

Example 7

A composite material is prepared and a press molded body is produced by cold press molding, which is performed in the same manner as that in Example 1. Polymer alloy components (thermoplastic resin) used in the composite material are prepared as follows. The results are shown in Table 2.

A polyamide 66 resin E2000 manufactured by Unitika Ltd and a PPO630 resin (poly(2,6-dimethyl-1,4-phenylene ether), PPE resin) manufactured by SABIC are prepared as thermoplastic resins. 100 parts by mass of the PPE resin with respect to 100 parts by mass of the polyamide 66, and 1.0 part by mass of citric acid (food additive) produced by Wako Pure Chemical Industries, Ltd with respect to 100 parts by mass of the PPE resin, are mixed and put into a kneader (model TEM-26SS manufactured by Toshiba Machine Co., Ltd) to be kneaded at 280° C., a feed amount of 20 kg/h, and a screw speed of 200 rpm. Thereby, polymer alloy components are prepared.

Example 8

A composite material is prepared and a press molded body is produced by cold press molding, which is performed in the same manner as that in Example 4. Polymer alloy components (thermoplastic resin) used in the composite material are prepared as follows. The results are shown in Table 2.

A polyamide 66 resin E2000 manufactured by Unitika Ltd and a PPO630 resin (poly(2,6-dimethyl-1,4-phenylene ether), PPE resin) manufactured by SABIC are prepared as thermoplastic resins. 100 parts by mass of the PPE resin with respect to 100 parts by mass of the polyamide 66, and 1.0 part by mass of citric acid (food additive) produced by Wako Pure Chemical Industries, Ltd with respect to 100 parts by mass of the PPE resin, are mixed and put into a kneader (model TEM-26SS manufactured by Toshiba Machine Co., Ltd) to be kneaded at 280° C., a feed amount of 20 kg/h, and a screw speed of 200 rpm. Thereby, polymer alloy components are prepared.

Comparative Example 3

A composite material is prepared and a press molded body is produced by cold press molding, which is performed in the same manner as that in Comparative Example 1. A thermoplastic resin used in the composite material is a polyamide 66 resin E2000 manufactured by Unitika Ltd. The results are shown in Table 2.

Comparative Example 4

A composite material is prepared and a press molded body is produced by cold press molding, which is performed in the same manner as in Comparative Example 2. A thermoplastic resin used in the composite material is a polyamide 66 resin E2000 manufactured by Unitika Ltd. The results are shown in Table 2.

TABLE 1

|  | Example 1 | Example 2 | Example 3 | Comparative example 1 |
|---|---|---|---|---|
| Composition of composite material | | | | |
| Polyamide-based resin (X) | | | | |
| Type | PA6 resin | PA6 resin | PA66 resin | PA6 resin |
| Mass ratio | 100 | 100 | 100 | 100 |
| Polyarylene ether-based resin (Y) | | | | |
| Type | PPE resin | PPE resin | PPE resin | — |
| Mass ratio relative to 100 parts by mass of polyamide-based resin | 100 | 50 | 50 | |
| Thermoplastic resin (Z) | | | | |
| Type | — | PS resin | PS resin | — |
| Mass ratio relative to 100 parts by mass of polyamide-based resin | 0 | 50 | 50 | 0 |
| Compatibilizer (citric acid) | | | | |
| Addition amount (part by mass) relative to 100 parts by mass of polyarylene ether-based resin (Y) | 1 | 3 | 3 | — |
| Complex viscosity coefficient of composite material | | | | |
| K1 | −0.68 | −1.30 | −1.89 | −0.37 |
| K2 | −0.42 | −0.30 | −0.27 | −0.25 |
| K3 | −1.73 | −1.52 | −1.12 | −0.46 |
| K4 | −1.53 | −0.61 | −0.66 | −0.49 |
| Evaluation of molded body | | | | |
| Shape of molded body | Dimple FIG. 3(b) | Dimple FIG. 3(b) | Dimple FIG. 3(b) | Dimple FIG. 3(b) |

TABLE 1-continued

|  | Example 1 | Example 2 | Example 3 | Comparative example 1 |
|---|---|---|---|---|
| Molded body produced under molding pressure of 5 MPa |  |  |  |  |
| Disturbance of fiber orientation | Good | Excellent | Excellent | Bad |
| Void | Excellent | Excellent | Excellent | Bad |
| Molded body produced under molding pressure of 20 MPa |  |  |  |  |
| Disturbance of fiber orientation | Good | Excellent | Excellent | Bad |
| Void | Excellent | Excellent | Excellent | Excellent |

TABLE 2

|  | Example 4 | Example 5 | Example 6 | Comparative example 2 | Example 7 | Example 8 | Comparative example 3 | Comparative example 4 |
|---|---|---|---|---|---|---|---|---|
| Composition of composite material |  |  |  |  |  |  |  |  |
| Polyamide-based resin(X) |  |  |  |  |  |  |  |  |
| Type | PA6 resin | PA6 resin | PA66 resin | PA6 resin | PA66 resin | PA66 resin | PA66 resin | PA66 resin |
| Mass ratio | 100 | 100 | 100 | 100 | 100 | 100 | 100 | 100 |
| Polyarylene ether-based resin(Y) |  |  |  |  |  |  |  |  |
| Type | PPE resin | PPE resin | PPE resin | — | PPE resin | PPE resin | — | — |
| Mass ratio relative to 100 parts by mass of polyamide-based resin | 100 | 50 | 50 | — | 100 | 100 | — | — |
| Thermoplastic resin (Z) |  |  |  |  |  |  |  |  |
| Type | — | PS resin | PS resin | — | — | — | — | — |
| Mass ratio relative to 100 parts by mass of polyamide-based resin | 0 | 50 | 50 | 0 | 0 | 0 | 0 | 0 |
| Compatibilizer (citric acid) |  |  |  |  |  |  |  |  |
| Addition amount (part by mass) relative to 100 parts by mass of polyarylene ether-based resin (Y) | 1 | 3 | 3 | — | 1 | 1 | — | — |
| Complex viscosity coefficient of composite material |  |  |  |  |  |  |  |  |
| K1 | −0.68 | −1.30 | −1.89 | −0.37 | −0.80 | −0.80 | −0.31 | −0.31 |
| K2 | −0.42 | −0.30 | −0.27 | −0.25 | −0.52 | −0.52 | −0.21 | −0.21 |
| K3 | −1.73 | −1.52 | −1.12 | −0.46 | −1.55 | −1.55 | −0.48 | −0.48 |
| K4 | −1.53 | −0.61 | −0.66 | −0.49 | −1.42 | −1.42 | −0.52 | −0.52 |
| Evaluation of molded body |  |  |  |  |  |  |  |  |
| Shape of molded body | Corrugated FIG. 10 | Corrugated FIG. 10 | Corrugated FIG. 10 | Corrugated FIG. 10 | Dimple FIG. 3(b) | Corrugated FIG. 10 | Dimple FIG. 3(b) | Corrugated FIG. 10 |
| Molded body produced under molding pressure of 5 MPa |  |  |  |  |  |  |  |  |
| Disturbance of fiber orientation | Good | Excellent | Excellent | Bad | Good | Good | Bad | Bad |
| Void | Excellent | Excellent | Excellent | Bad | Excellent | Excellent | Bad | Bad |
| Molded body produced under molding pressure of 20 MPa |  |  |  |  |  |  |  |  |
| Disturbance of fiber orientation | Good | Excellent | Excellent | Bad | Good | Good | Bad | Bad |
| Void | Excellent | Excellent | Excellent | Excellent | Excellent | Excellent | Excellent | Excellent |

K1 to K4 in Tables 1 and 2 are as follows.

K1 represents an inclination of an approximate straight line obtained by performing strain sweep tests (0% to 100%) at a temperature of 270° C., a shear of 100 rad/sec, and a normal load of 2N, plotting strain (%)–complex viscosity coefficient (Pa·sec) of the composite material in a range of not less than 35%, and performing linear approximation thereon.

K2 represents an inclination of an approximate straight line obtained by performing strain sweep tests (0% to 100%)

at a temperature of 270° C., a shear of 100 rad/sec, and a normal load of 2N, plotting strain (%)–complex viscosity coefficient (Pa·sec) of the composite material in a range of less than 35%, and performing linear approximation thereon.

K3 represents an inclination of an approximate straight line obtained by performing shear sweep tests (0 rad/sec to 400 rad/sec) at a temperature of 270° C., a strain of 30%, and a normal load of 2N, plotting shear (rad/sec)–complex viscosity coefficient (Pa·sec) of the composite material in a range of not less than 100 rad/sec, and performing linear approximation thereon.

K4 represents an inclination of an approximate straight line obtained by performing shear sweep tests (0 rad/sec to 400 rad/sec) at a temperature of 270° C., a strain of 30%, and a normal load of 2N, plotting shear (rad/sec)–complex viscosity coefficient (Pa·sec) of the composite material in a range of less than 100 rad/sec, and performing linear approximation thereon.

INDUSTRIAL APPLICABILITY

A composite material and a molded body production method using the composite material of the present invention can be used in various components, such as an inner plate, an outer plate, and a structural member of an automobile; and a frame or a housing of various machines or electrical products. Preferably, the molded body can be used as an automobile part.

Although the present invention has been described in detail with reference to the specific embodiments, it will be apparent to those skilled in the art that various changes and modifications can be made without departing from the spirit and scope of the present invention.

The present application is based on a Japanese Patent Application (JP-A-2017-018358) filed on Feb. 3, 2017, contents of which are incorporated herein by reference.

REFERENCE SIGNS LIST

K1: An inclination of an approximate straight line obtained by performing strain sweep tests from 0% to 100% on the composite material at a temperature of 270° C., a shear of 100 rad/sec, and a normal load of 2N, plotting in double logarithmic scales, the values of strain % versus the values of complex viscosity coefficient Pa·sec in a range of not less than 35% strain, and performing linear approximation thereon.

K2: An inclination of an approximate straight line obtained by performing strain sweep tests from 0% to 100% on the composite material at a temperature of 270° C., a shear of 100 rad/sec, and a normal load of 2N, plotting in double logarithmic scales, the values of strain % versus the values of complex viscosity coefficient Pa·sec in the range of less than 35% strain, and performing linear approximation thereon.

K3 represents an inclination of an approximate straight line obtained by performing shear sweep tests from 0 rad/sec to 400 rad/sec on the composite material at a temperature of 270° C., a strain of 30%, and a normal load of 2N, plotting in double logarithmic scales, the values of shear rad/sec versus the values of complex viscosity coefficient Pa·sec in a range of not less than 100 rad/sec, and performing linear approximation thereon.

K4 represents an inclination of an approximate straight line obtained by performing shear sweep tests from 0 rad/sec to 400 rad/sec on the composite material at a temperature of 270° C., a strain of 30%, and a normal load of 2N, plotting in double logarithmic scales, the values of shear rad/sec versus the values of complex viscosity coefficient Pa·sec in a range of less than 100 rad/sec, and performing linear approximation thereon.

X-X': Denotation of a cross sectional direction in FIG. 3(c).

401: The periphery of a bent portion (transition section) leading from a vertical plane to a top plane (a conventional composite material).

402: The periphery of a bent portion (transition section) leading from a vertical plane to a top plane (an example of a composite material of the present invention).

501: A portion (portion where the fiber form is likely to be disturbed) where carbon fiber form in a composite material is likely to be different from that at the time of forming a molded body.

601: Composite material

602: Upper mold of a mold

603: Lower mold of the mold

701: A portion of the upper mold of the mold. A portion of the upper mold that first comes into contact with the composite material. Protruding portion.

702: Composite material

703: A portion of a composite material which is formed while the composite material is being stretched in a stretching step.

704: A portion of the composite material that is pulled into a mold by a protruding portion of an upper mold of the molds in the stretching step.

705: A portion of the composite material which is formed by stretching the composite material in the stretching step.

706: A portion of the composite material pulled into the mold by the protruding portion of the upper mold of the molds.

801: Enlargement source of FIGS. 8(b) and 8(c).

802: A vertical plane portion right above a bent portion (transition section) leading from a vertical plane to a top plane (a conventional composite material).

803: A vertical plane portion right above a bent portion (transition section) leading from a vertical plane to a top plane (an example of a composite material of the present invention).

901: A vertical plane of a molded body

902: A bent portion (transition section) leading from the vertical plane to a top plane of the molded body 903: A top plane of the molded body 904: A vertical plane portion right above the bent portion (transition section) leading from the vertical plane to the top plane

The invention claimed is:

1. A molded body production method for producing a molded body having a vertical plane and a top plane, the method comprising:
cold pressing a composite material including carbon fibers having a weight average fiber length of 1 mm or more and 100 mm or less and a thermoplastic resin, wherein the composite material satisfies K1≤1.5×K2, wherein:
K1 represents an inclination of an approximate straight line obtained by:
performing strain sweep tests from 0% to 100% on the composite material at a temperature of 270° C., a shear of 100 rad/sec, and a normal load of 2N;

plotting, in double logarithmic scales, the values of strain % versus the values of complex viscosity coefficient Pa·sec in a range of 35% strain or more; and performing linear approximation thereon, and K2 represents an inclination of an approximate straight line obtained by:

performing strain sweep tests from 0% to 100% on the composite material at a temperature of 270° C., a shear of 100 rad/sec, and a normal load of 2N;

plotting, in double logarithmic scales, the values of strain % versus the values of complex viscosity coefficient Pa·sec in a range of less than 35% strain; and performing linear approximation thereon, wherein the cold pressing includes at least the following steps A-1) to A-3):

step A-1) heating the composite material to a softening temperature or higher of the thermoplastic resin contained in the composite material;

step A-2) disposing the heated composite material obtained in step A-1) in a mold whose temperature is adjusted to be lower than the softening temperature of the thermoplastic resin; and step A-3) pressing and molding the composite material disposed in the mold in step A-2); and wherein the step A-3) further comprises a stretching step and a flow step, wherein the composite material sandwiched between an upper mold and a lower mold is pulled and stretched by the upper mold in the stretching step.

2. The molded body production method according to claim 1, wherein the molded body has a dimple shape, a corrugated shape, or a hat shape.

3. The molded body production method according to claim 1, wherein the composite material satisfies K3≤0.95×K4, wherein:

K3 represents an inclination of an approximate straight line obtained by:

performing shear sweep tests from 0 rad/sec to 400 rad/sec on the composite material at a temperature of 270° C., a strain of 30%, and a normal load of 2N;

plotting, in double logarithmic scales, the values of shear rad/sec versus the values of complex viscosity coefficient Pa·sec in a range of shear of 100 rad/sec or more; and performing linear approximation thereon, and K4 represents an inclination of an approximate straight line obtained by:

performing shear sweep tests from 0 rad/sec to 400 rad/sec on the composite material at a temperature of 270° C., a strain of 30%, and a normal load of 2N;

plotting, in double logarithmic scales, the values of shear rad/sec versus the values of complex viscosity coefficient Pa·sec in a range of shear of less than 100 rad/sec; and performing linear approximation thereon.

4. The molded body production method according to claim 1, wherein a complex viscosity coefficient of the composite material is 1000 Pa·sec or less at a temperature of 270° C., a shear of 100 rad/sec, a strain of 30% and a normal load of 2N.

5. The molded body production method according to claim 1, wherein the thermoplastic resin includes at least two types of a thermoplastic resin X and a thermoplastic resin Y.

6. The molded body production method according to claim 1, wherein the thermoplastic resin X is a polyamide-based resin A, and the thermoplastic resin Y is a polyarylene ether-based resin B.

7. The molded body production method according to claim 1, wherein a portion which forms the vertical plane is formed while the composite material is stretched.

8. The molded body production method according to claim 1, wherein the carbon fibers contained in the composite material are dispersed randomly in two-dimensions with long axial directions thereof in in-plane direction of the composite material.

9. The molded body production method according to claim 1, wherein the carbon fibers are dispersed randomly in two-dimensions in an area right above a transition section that is a bent portion leading from the vertical plane to the top plane in the molded body.

10. The molded body production method according to claim 1, wherein the stretching step starts when a part of the upper mold comes into contact with the composite material, and ends at the time the flow step starts, and the flow step starts when pressure is observed by a pressure gauge of a molding machine.

11. The molded body production method according to claim 1, wherein the carbon fibers having a weight average fiber length of 1 mm or more and 100 mm or less are stretched while moving in a direction parallel to the stretching direction.

* * * * *